United States Patent [19]
Glover et al.

[11] Patent Number: 5,901,010
[45] Date of Patent: May 4, 1999

[54] MAGNETIC DISC RECORDING SYSTEM EMPLOYING TWO STAGE ACTUATORS FOR SIMULTANEOUS ACCESSES THROUGH MULTIPLE RECORDING HEADS

[75] Inventors: Neal Glover, Broomfield; Howard H. Sheerin, Denver; Paul M. Romano, Boulder; John Schadegg, Niwot, all of Colo.

[73] Assignee: Cirrus Logic, Inc., Fremont, Calif.

[21] Appl. No.: 08/796,310

[22] Filed: Feb. 7, 1997

[51] Int. Cl.$^6$ .................................................. B07B 1/28
[52] U.S. Cl. ............................ 360/78.12; 360/78.06; 360/106
[58] Field of Search .................... 360/78.12, 51, 360/78.05, 78.06, 78.09, 48, 106; 369/94, 58; 711/117

[56] References Cited

U.S. PATENT DOCUMENTS

| | | |
|---|---|---|
| 5,177,652 | 1/1993 | Yamaguchi et al. . |
| 5,189,578 | 2/1993 | Mori et al. ................................ 360/106 |
| 5,261,058 | 11/1993 | Squires et al. . |
| 5,293,282 | 3/1994 | Squires et al. . |
| 5,341,351 | 8/1994 | Ng . |
| 5,355,486 | 10/1994 | Cornaby . |
| 5,523,901 | 6/1996 | Anderson et al. . |
| 5,699,207 | 12/1997 | Supino et al. ......................... 360/78.09 |
| 5,726,818 | 3/1998 | Reed et al. ................................ 360/51 |
| 5,751,733 | 5/1998 | Glover .................................... 371/40.3 |

OTHER PUBLICATIONS

Denny K. Miu, "Silicon Microactuators for Rigid Disk Drives," *Data Storage*, pp. 33–40, Jul./Aug. 1995.
Sorin G. Stan, "Twin-Actuators for Ultra-Fast Access in CD-ROM Systems," *IEEE Transactions on Consumer Electronics*, vol. 42, No. 4, pp. 1073–1084, Nov. 1996.

*Primary Examiner*—Aristotelis M. Psitos
*Assistant Examiner*—Joseph M Vann
*Attorney, Agent, or Firm*—Howard H. Sheerin; Dan A. Shifrin

[57] ABSTRACT

A magnetic disc storage system employing two stage actuators for simultaneously positioning recording heads over the top and bottom surfaces of the disc is disclosed. The recording heads are fastened to a distal end of respective top and bottom load beams. A base end of the load beams is connected to a voice coil motor (VCM) rotary actuator which simultaneously positions both recording heads over the disc. A silicon microactuator is also fastened to the distal end of at least one of the load beams for positioning the recording heads independent of one another, thereby allowing simultaneous tracking of embedded servo data. Various data formats are provided, including interleaving logical sector numbers, symbols of a logical sector, and segments of a logical sector, between the top and bottom physical sectors of a track. Complexity and cost of the servo controllers is reduced through the use of sliding mode control: a simple, robust and fast control system implemented using simple switching circuitry, small lookup tables, and simplified binary multipliers (shift registers). A dual path read channel implemented in a single integrated circuit is provided for parallel processing the read signals from the top and bottom recording heads.

7 Claims, 17 Drawing Sheets

MAGNETIC DISC RECORDING SYSTEM EMPLOYING TWO STAGE ACTUATORS FOR SIMULTANEOUS ACCESSES THROUGH MULTIPLE RECORDING HEADS

FIELD OF INVENTION

The present invention relates to the control of disc storage systems for digital computers, particularly to increasing the throughput by simultaneously accessing dual recording heads (top and bottom surface) positioned by a voice coil motor (VCM) rotary actuator and at least one silicon microactuator.

BACKGROUND OF THE INVENTION

Magnetic disc storage devices are commonly used by host computer systems to store large amounts of digital data in a non-volatile manner. Typically, the magnetic disc is partitioned into a number of concentric data tracks, where each data track is further partitioned into a number of data sectors. To write and read data to and from a target data sector on a particular track, a recording head (read/write head) is positioned over the track by a servo controller. Then, to write data to the track, the data serves to modulate a current in a write coil of the recording head as the disc spins underneath in order to write a sequence of corresponding magnetic flux transitions onto the surface of the disc. To read this recorded data, the recording head is again positioned over the track and transduces the magnetic flux transitions into an analog read signal comprising a sequence of pulses representing the recorded data. These pulses are then detected and decoded into an estimated data sequence by a read channel and, in the absence of errors, the estimated data sequence matches the recorded data sequence.

The servo controller performs two functions: "seeking" to a selected track, and "tracking" the centerline of the track while reading or writing data to/from the track. These operations are typically carried out using one of two serving methods—"dedicated servo" or "embedded servo". Dedicated servo is typically employed in a multi-disc system where recording heads are positioned over each disc (top and bottom surfaces) by means of a single voice coil rotary actuator. One disc is reserved, or dedicated, for storing the servo data for simultaneously controlling the position of all of the recording heads. Only one recording head is active during each operation because the skew between the discs is too great to allow simultaneous tracking of two surfaces. Another drawback of dedicated servo systems is an inherent constraint on the track density (number of tracks per inch or TPI). The skew between the dedicated servo surface and the other data surfaces disrupts the tracking operation if the track density is too high.

Embedded servo overcomes the TPI limitation of dedicated servo by recording servo data (in the form of intermittent spokes or wedges) embedded between the data sectors on each surface of the disc. In this manner, the recording heads can be positioned independently, which allows accurate tracking even at very high track densities. However, in a multi-surface embedded servo system where the recording heads are positioned by a single VCM rotary actuator, only one recording head can be active during each read or write operation. Again, this is due to the skew between the disc surfaces, and it prevents increasing the throughput of the recording system because it prevents accessing the disc through multiple recording heads simultaneously. As the speed of microprocessors increases and data intense applications proliferate (e.g., audio/video applications), the data transfer rate of storage devices will represent a significant bottleneck.

There are prior art recording devices that address this concern by providing simultaneous access to the disc through multiple recording heads, where each head is controlled independently using separate VCM rotary actuators. On such system is disclosed in U.S. Pat. No. 5,355,486 entitled "SYSTEM FOR ALLOCATING TASKS BETWEEN TWO ACTUATORS SERVICING THE SAME MAGNETIC DISK MEDIA IN A SINGLE DISK DRIVE." Obviously, the problem with this design is the increased cost associated with the additional hardware for each VCM rotary actuator, as well as the increased cost associated with adding servo control electronics to control the motion of each actuator. Additionally, it requires separate read channels for detecting and decoding the digital data from the analog read signals emanating from each recording head. Due to the skew between disc surfaces, the read channels must operate independently and would likely reside in separate integrated circuits to avoid cross talk and noise as a result of independently clocking each circuit.

There is, therefore, a need for a cost-effective way to simultaneously access multiple recording heads positioned over a disc storage medium in order to economically increase the throughput. It requires efficient use of actuator hardware, as well as cost effective designs for the servo control electronics. Furthermore, it requires efficient data formats and buffering in order to take full advantage of disc access through multiple data streams. Still further, it requires cost effective read channel circuitry that preferably resides on the same piece of silicon within a single integrated chip.

SUMMARY OF THE INVENTION

A magnetic disc storage system employing two stage actuators for simultaneously positioning recording heads over the top and bottom surfaces of the disc is disclosed. The recording heads are fastened to a distal end of respective top and bottom load beams. A base end of the load beams is connected to a voice coil motor (VCM) rotary actuator which simultaneously positions both recording heads over the disc. A silicon microactuator is also fastened to the distal end of at least one of the load beams for positioning the recording heads independent of one another, thereby allowing simultaneous tracking of embedded servo data. Various data formats are provided, including interleaving logical sector numbers, symbols of a logical sector, and segments of a logical sector, between the top and bottom physical sectors of a track. Complexity and cost of the servo controllers is reduced through the use of sliding mode control: a simple, robust and fast control system implemented using simple switching circuitry, small lookup tables, and simplified binary multipliers (shift registers). A dual path read channel implemented in a single integrated circuit is provided for parallel processing the read signals from the top and bottom recording heads.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Data Format

Figure 1A:
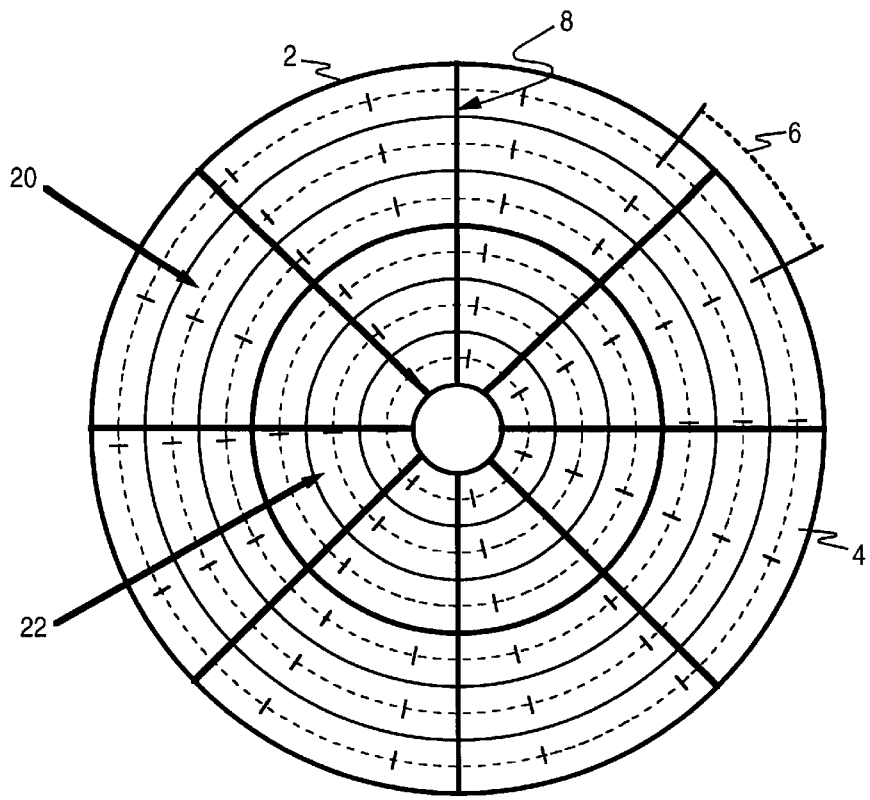
FIG. 1A shows an example format of a disc storage medium comprised of a plurality of concentric data tracks and embedded servo wedges, where each data track is partitioned into a plurality of data sectors.
Figure 1B:
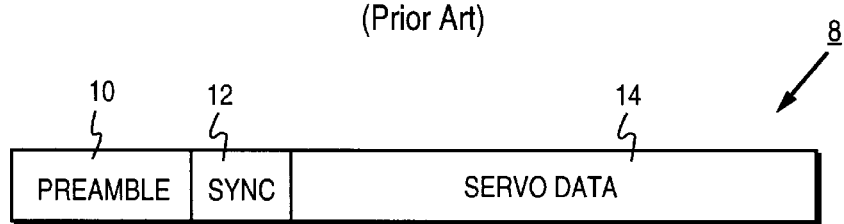
FIG. 1B shows an example format of a servo sector of a servo wedge, where the servo data typically comprises a track address for coarse positioning of the recording head over the disc, and servo bursts for fine positioning the recording head over a centerline of the track.

FIG. 1A shows an exemplary data format of a storage disc 2 comprising a series of concentric data tracks 4 wherein each data track 4 comprises a plurality of sectors 6 with embedded servo wedges 8. The embedded servo wedges are typically written onto the disc using a specialized servo writer after the disc is manufactured; it is important that the storage system not overwrite the servo wedges during normal operation. Each servo sector of a servo wedge comprises a preamble 10 and sync field 12 for synchronizing to the servo data 14 as shown in FIG. 1B. The servo data 14 typically comprises a track address 16 for coarse positioning the recording head over a selected track, and servo bursts 18 for fine positioning the recording head over a centerline of the selected track while writing and reading data. Additionally, the servo data may comprise data used to locate the relative position of the data sectors rather than record a separate "ID-field" before each data sector. The track addresses 16 are typically detected by an analog or discrete time pulse detector, but they may also be detected using a discrete time sequence detector in a sampled amplitude read channel. The servo bursts 18 are typically detected using an analog or discrete time burst area detector.

The storage capacity at the outer tracks can be increased due to the increase in circumferential recording area and the decrease in intersymbol interference (ISI). Accordingly, the disc shown in FIG. 1A is partitioned into an outer zone 20 comprising fourteen data sectors per track, and an inner zone 22 comprising seven data sectors per track. In practice, the disc is actually partitioned into several zones, wherein the capacity and data rate increases from the inner to outer zones. The servo sectors 8 are typically recorded at the same data rate across all of the zones and, therefore, appear as a wedge embedded in the data sectors, i.e., wider at the outer diameter tracks and converging toward the inner diameter tracks.

Figure 1C:
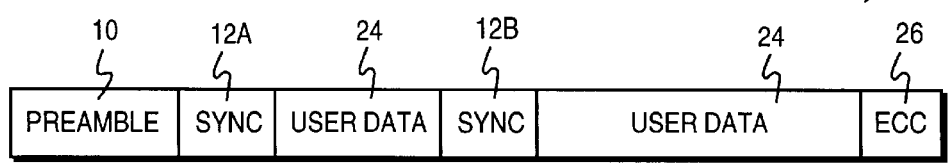
FIG. 1C shows an example format of a data sector of a data track, including a secondary sync mark for retroactive synchronization.

FIG. 1C shows an example format of a data sector 6 within a track 4. Similar to a servo sector 8, a data sector 6 comprises a preamble field 10 and a primary sync field 12A for synchronizing to the sector data (i.e., the user data 24). Additionally, the present invention provides a secondary sync mark 12B for use in retroactively synchronizing to the user data in the event the primary sync mark 12A is undetectable. For further details concerning retroactive synchronization, refer to copending U.S. patent application Ser. No. 08/745,913 entitled "THERMAL ASPERITY COMPENSATION USING MULTIPLE SYNC MARKS FOR RETROACTIVE AND SPLIT SEGMENT DATA SYNCHRONIZATION IN A MAGNETIC DISK STORAGE SYSTEM." A data sector also typically comprises a number of redundancy bytes 26 associated with a predetermined error correcting code (ECC) for use in detecting and correcting errors in the user data 24 induced by noise in the read signal upon read back.

Storage System Overview

Figure 2:
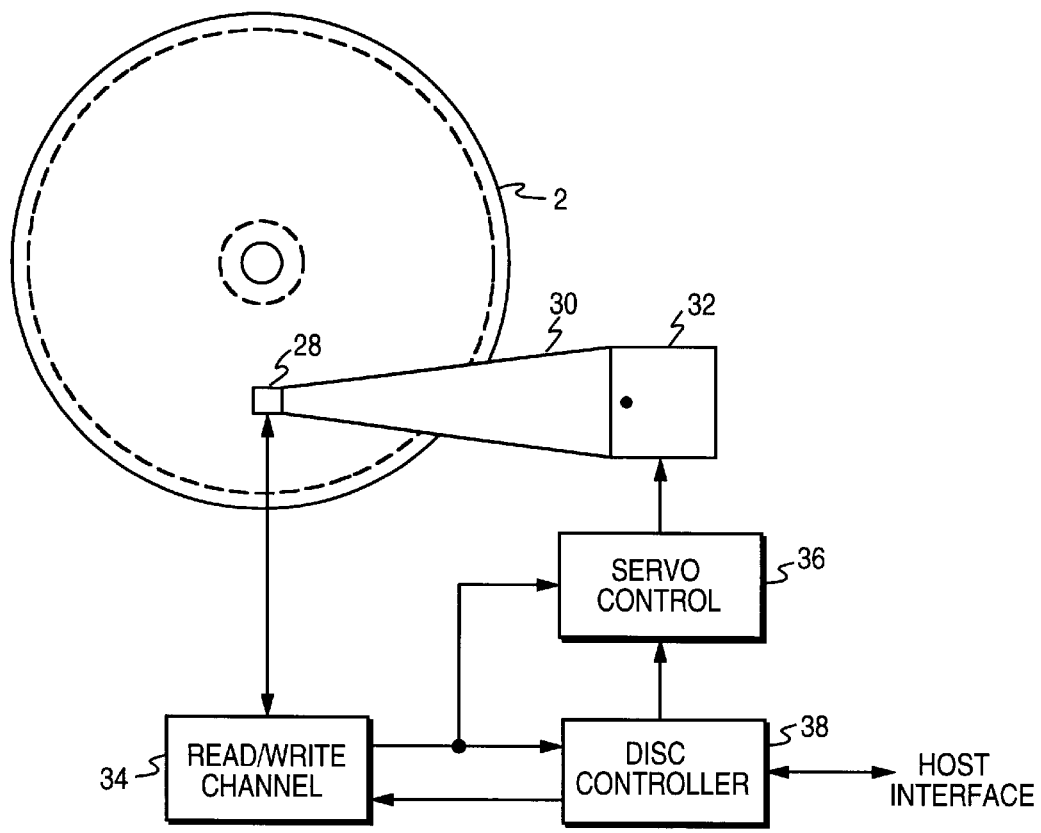
FIG. 2 shows a block diagram of a conventional magnetic disc storage system comprising a recording head actuated over the disc by a rotary voice coil motor (VCM), a read/write channel interfaced to the recording head, a servo controller for processing the embedded servo data and positioning the recording head over selected data tracks, and a disc controller interfaced to a host computer for controlling the overall operation of the storage system.

FIG. 2 is a block diagram of the basic components typically found in a magnetic disc storage device. A recording head 28 (inductive or magneto-resistive) is positioned over the magnetic disc 2 by a load beam 30. The load beam 30 comprises a base end attached to a voice coil motor (VCM) rotary actuator 32 and a distal end where the recording head is attached. The VCM actuator 32 pivots the load beam 30 in order to slide the recording head 28 radially over the disc and position it over a selected track during read and write operations.

A read/write channel 34 interfaces with the recording head 28 in order to write and readback data recorded on the disc 2. Read channels in the past were typically implemented using a simple analog pulse detector, where the presence of a pulse translated to a "1" bit and the absence of a pulse translated to a "0" bit. Recently, however, the industry has been moving toward sampled amplitude read channels due to their superior ability to compensate for intersymbol interference (ISI) and other channel noise, thereby allowing for higher data densities. In sampled amplitude read channels, the analog read signal is sampled at the baud rate, the samples equalized into a desired partial response, and a most likely estimated data sequence determined for a number of consecutive sample values. A more detailed description of sampled amplitude read channels is provided below with reference to FIG. 8.

The read channel detects the user data 24 as well as the servo data 14 in the servo wedges 8 of FIG. 1A. The servo data (track address 16 and burst 18 information) is transmitted to a servo controller 36 which, in response, computes a motor control signal applied to the VCM rotary actuator 32. Thus, the servo controller 36 is a closed loop feedback system responsible for positioning the recording head 28 over a selected track (seek operation), and for keeping the recording head 28 aligned over the centerline of the selected track while writing and reading data to and from the disc (tracking operation). The servo controller of the present invention is a low cost sliding mode controller, the details for which are provided below with reference to FIGS. 7A–7D.

A disc controller 38 interfaces with the host computer system, receiving read/write commands and transferring the user data to and from the storage device. The host system interfaces with the disc controller by specifying a read or write command for a logical sector number (LSN), and the disc controller converts the LSN into a physical sector number (PSN) representing a physical sector on the disc. In this manner, the disc controller can "map out" defective physical sectors and reassign a corresponding logical sector number to a spare sector. The disc controller also typically comprises an error correcting system for generating redundancy symbols 26 appended to the user data 24 during write operations (see FIG. 1C), and for detecting and correcting errors in the user data using the redundancy symbols upon readback. An example Reed-Solomon type of error correction system is disclosed in U.S. Pat. No. 5,446,743 entitled "COEFFICIENT UPDATING METHOD AND APPARATUS FOR REED-SOLOMON DECODER."

In the present invention, the read/write channel 34 resides in a single integrated circuit and is capable of simultaneously processing multiple data streams at a time. In this manner, the interface and operation of the disc controller 38 can remain substantially unchanged while significantly increasing the storage system's throughput. The necessary buffering and data interleaving is performed by the read/write channel 34 virtually transparent to the rest of the system, thereby simplifying the integration of the present invention into existing disc storage devices.

Multiple Actuators

Figure 3:
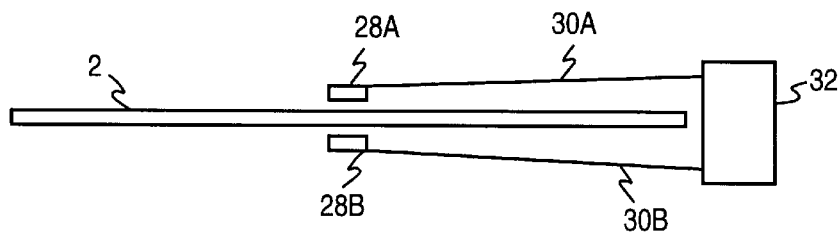
FIG. 3 shows an aspect of the present invention wherein dual recording heads are positioned over the top and bottom surfaces of the disc by a VCM rotary actuator and at least one silicon microactuator.

The present invention increases the throughput of an embedded servo storage system by accessing the disc through multiple recording heads. In the preferred embodiment, two recording heads per disc (top and bottom 28A and 28B) provide simultaneous access to the top and bottom surfaces of the disc 2 as shown in FIG. 3. The recording heads are connected to the distal end of top and bottom load beams 30A and 30B which are simultaneously positioned by a VCM rotary actuator 32 similar to the single recording head system shown in FIG. 2. In addition, at least one silicon microactuator is located at the distal end of the load beams to provide independent positioning of the recording heads. In this manner, the centerline of a top and bottom track can be accurately and simultaneously tracked as long as the silicon microactuator has enough range to account for the skew between the tracks. In an alternative embodiment, two silicon microactuators are employed, one for each recording head, which effectively doubles the microactuator range.

Figure 4A:
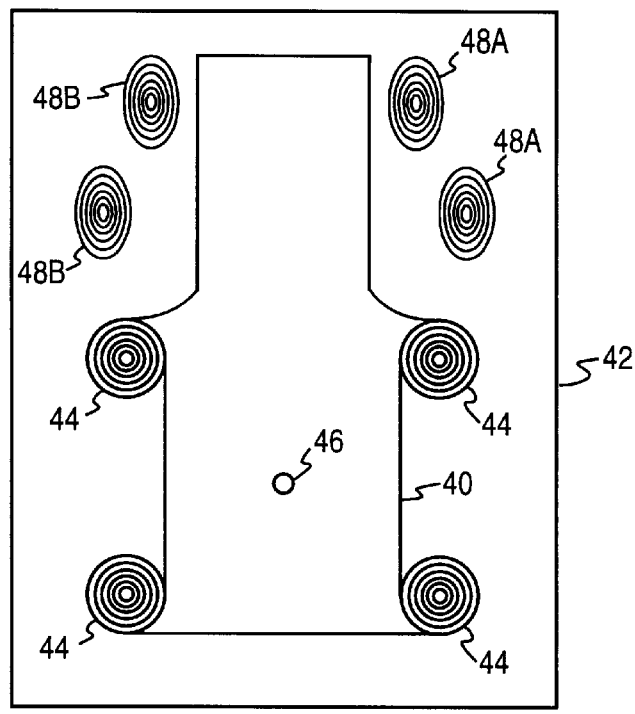
FIG. 4A shows the general design of a silicon microactuator.

Silicon microactuators are well known in the art. One exemplary embodiment is described by Denny K. Miu in "Silicon Microactuators for Rigid Disk Drives", *Data Storage,* July/August 1995, the disclosure of which is hereby incorporated by reference. FIG. 4A shows a rather simplified top view of the silicon microactuator disclosed by Miu. In essence, a cavity is etched into the bottom surface of a silicon wafer leaving internal "walls" and a thin top layer. A longitudinal, movable platform 40 is then etched out of the thin top layer and suspended to the silicon frame 42 by means of special spiral microsprings 44. The spiral microsprings 44 provide a bias force to keep the platform 40 in a center position when there is no actuator force. The recording head is inserted into the cavity of the silicon frame and attached to the underside of the movable platform 40. The silicon frame 42 is attached to the load beam and comes in contact at a nitride bead 46 located at the center of the movable platform 40. The nitride bead 46 provides a vertical load point as well as a pivot point for the movable platform 40 and attached recording head. A pair of micromotors are fabricated on both sides of the moveable platform and consist of microcoils 48A and 48B, respectively. When current is applied to the microcoils, a magnetic flux is generated which exerts a torque force and pivots the moveable platform 40 about the nitride bead 46, thereby providing radial movement over the disc for short seeks and for tracking.

In the embodiment of the present invention that employs a single microactuator, the VCM rotary actuator 32 controls the seeking motion for both heads, and the tracking motion for the head without a microactuator. This embodiment is operable as long as the microactuator controlling the tracking motion of its recording head has enough range to account for the skew in the tracks between the top and bottom surfaces. In the event that the microactuator cannot provide enough range, an alternative embodiment is to employ a microactuator for each recording head, which effectively doubles the range.

Figure 4B:
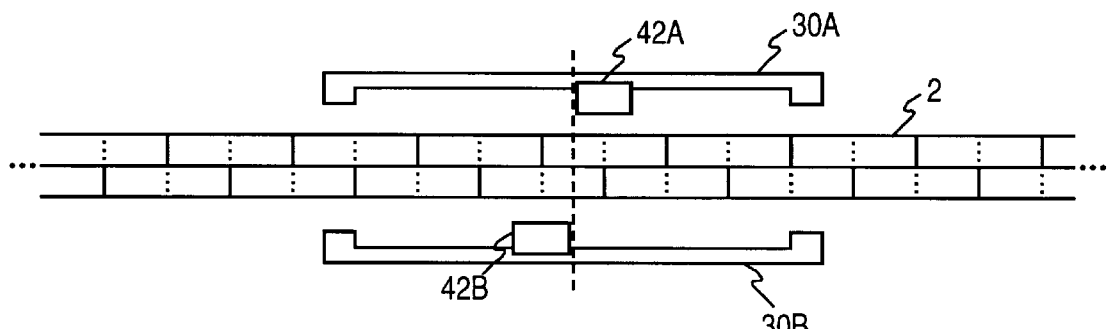
FIG. 4B illustrates how the VCM servo controller positions the top and bottom load beams in order to keep the top and bottom microactuators in the center of their operating ranges.

The dual microactuator embodiment of the present invention is shown in FIG. 4B, which also illustrates an example skew between the top and bottom tracks. In order to realize the increased range, the VCM rotary actuator 32 positions the top and bottom load beams 30A and 30B such that the microactuators 42A and 42B remain as close as possible to their center positions. This is accomplished by adjusting the position of the top and bottom load beams 30A and 30B until the microactuator offsets are equal to each other. With this embodiment it is also possible to access different top and bottom tracks simultaneously, if desired, as long as there is sufficient range in the microactuators.

Figure 5A:
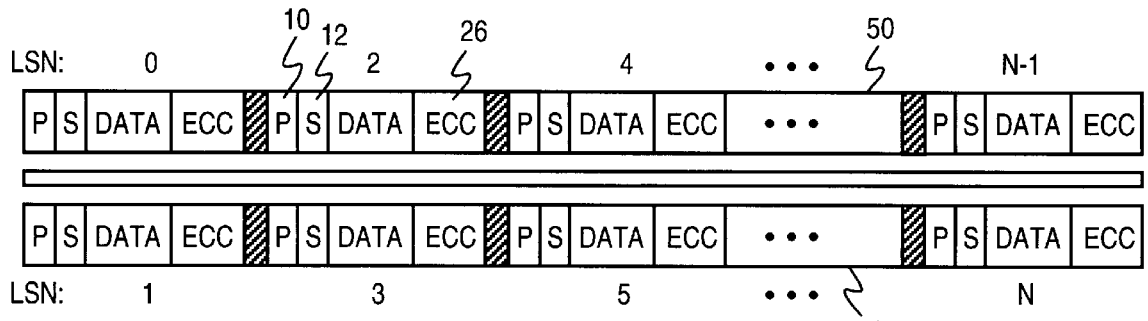
FIG. 5A–5C show various data formats provided by the present invention, including interleaving logical sector numbers, symbols of a logical sector, and segments of a logical sector, between the top and bottom physical sectors of a track.
Figure 5B:
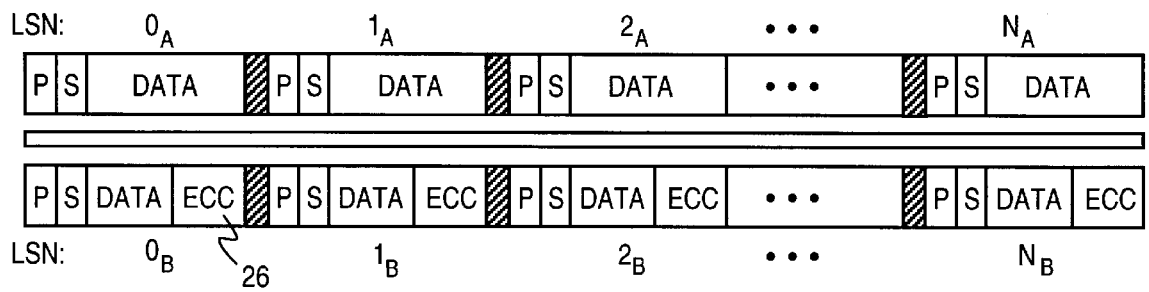
Figure 5C:
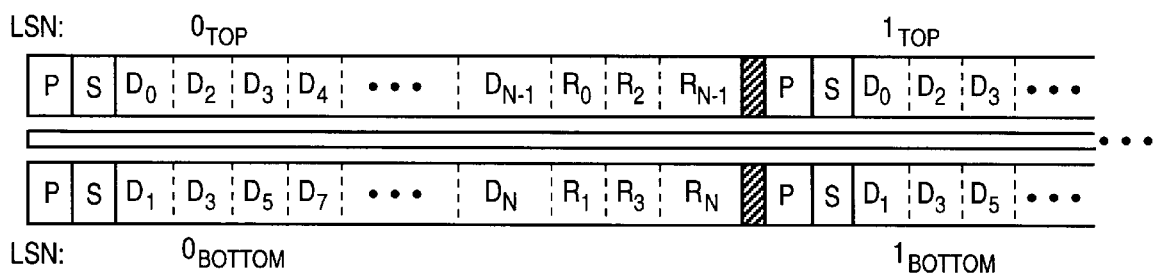

FIGS. 5A through 5C illustrate various alternative data formats for use in the dual recording head system of the present invention. In FIG. 5A, the logical sector numbers (LSN) are assigned to the physical sectors of the top track 50 and the bottom track 52 in an interleaved manner as shown. This allows for simultaneous and contiguous access to the logical sectors by writing/reading the top and bottom sectors in parallel. When reading the top and bottom sectors in parallel, buffering in the read/write channel 34 and/or in the disc microcontroller 38 automatically removes any skew that can occur between the top and bottom tracks. If a physical sector in either of the top or bottom tracks is defective and consequently mapped to a spare sector, the buffer management can also be implemented so as to avoid having to map both the top and bottom physical sectors to spare sectors. For example, if the second physical sector in the top track (corresponding to LSN of 2) is defective and mapped to a spare sector, then the physical sectors between the defective sector and the spare sector can be buffered to prevent having to map the second physical sector in the bottom track (corresponding to LSN of 3) to a spare sector. The preferred embodiment for mapping defective sectors to spare sectors in order to reduce access latency and minimize the required buffer size is to disperse spare sectors at a regular interval around the track. This aspect of the present invention is disclosed in detail in co-pending U.S. patent application Ser. No. 08/761,993 entitled "DISC STORAGE SYSTEM WITH SPARE SECTORS DISPERSED AT A REGULAR INTERVAL AROUND A DATA TRACK TO REDUCE ACCESS LATENCY" the disclosure of which is hereby incorporated by reference.

An alternative data format and assignment of logical sector numbers to physical sectors is shown in FIG. 5B. In this embodiment, each logical sector is divided into two sections designated $0_A$ stored in the top data track and $0_B$ stored in the bottom data track. The advantages to this format include the ability to increase the logical sector size (e.g., double the sector size) while decreasing the number of ECC symbols. Referring again to FIG. 5A, both the top and bottom physical sectors comprise ECC symbols 26 for detecting and correcting errors in the respective top and bottom logical sectors. In FIG. 5B, only the bottom physical sector comprises ECC symbols 26 for detecting and correcting errors over the entire logical sector (e.g., $0_A$ and $0_B$).

Yet another alternative data format is shown in FIG. 5C. In this embodiment, the symbols of a logical sector are interleaved between the top and bottom physical sectors; i.e., the even numbered symbols of a logical sector are stored in the top physical sector ($0_{TOP}$), and the odd numbered symbols are stored in the bottom physical sector ($0_{BOTTOM}$). The interleaving is extended throughout the entire logical sector including the ECC redundancy symbols $R_0$–$R_N$. This ensures that in a multiple interleave error correction system, such as disclosed in the above referenced U.S. Pat. No. 5,446,743, a burst error will spread across the multiple interleaved codewords. An advantage to this format is that it minimizes the size of the data buffer. As described in greater detail below, to implement the format of FIG. 5C only enough of the logical sector is buffered to account for the skew between the top and bottom tracks, whereas whole logical sectors must be buffered to implement the formats of FIG. 5A and FIG. 5B.

Sliding Mode Controllers

The servo controller 36 of FIG. 2 is typically implemented in the prior art as a linear controller employing proportional-integral-derivative (PID) feedback and/or state estimators. The problem with these types of linear controllers, however, is they are sensitive to parametric variations in the VCM control system and to external load disturbances. Conventional adaptive linear controllers overcome these sensitivity problems by continuously re-programming the controller to compensate for the parameter variations and load disturbances. Although adequate, adaptive control systems can be overly complex and expensive to implement. Furthermore, adaptive linear controllers require notch filters to compensate for mechanical resonances. The cost of conventional linear servo controllers obviously increases with the number of servo control loops in a multiple actuator disc storage system.

Sliding mode control is a low cost, less complex solution to the sensitivity and resonance problems inherent in the control of a disc drive actuator. The low cost and simplicity of sliding mode control is congruous with the requirements of a multiple actuator system. It requires only switching logic, binary multipliers (shift registers), adders, and a small lookup table to implement.

Figure 6A:
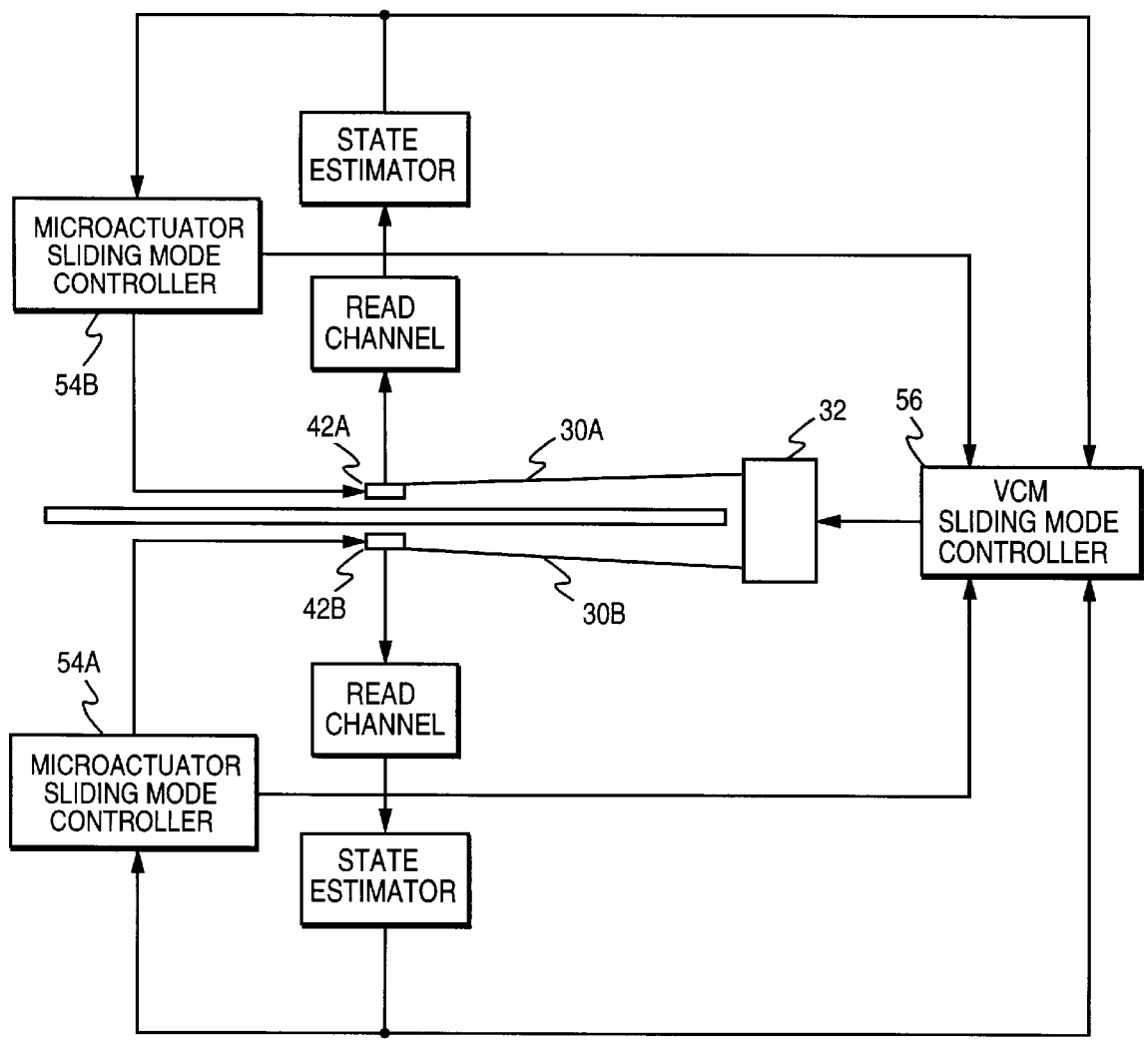
FIG. 6A is a block diagram showing three sliding mode controllers for controlling the top and bottom microactuators and the VCM actuator, respectively.

FIG. 6A shows the embodiment of the present invention employing microactuators to control the tracking operation of both the top and bottom recording heads. This embodiment requires three sliding mode controllers, two microactuator sliding mode controllers 54A and 54B, and a VCM sliding mode controller 56 for controlling the VCM rotary actuator 32. The VCM sliding mode controller 56 processes the position information from both the top and bottom recording heads at the output of the state estimators, as well as control information from the microactuator sliding mode controllers 54A and 54B, in order to adjust the position of the top and bottom load beams 30A and 30B during tracking operations so that the top and bottom microactuators 42A and 42B remain as close as possible to the center of their ranges as shown in FIG. 4B.

Figure 6B:
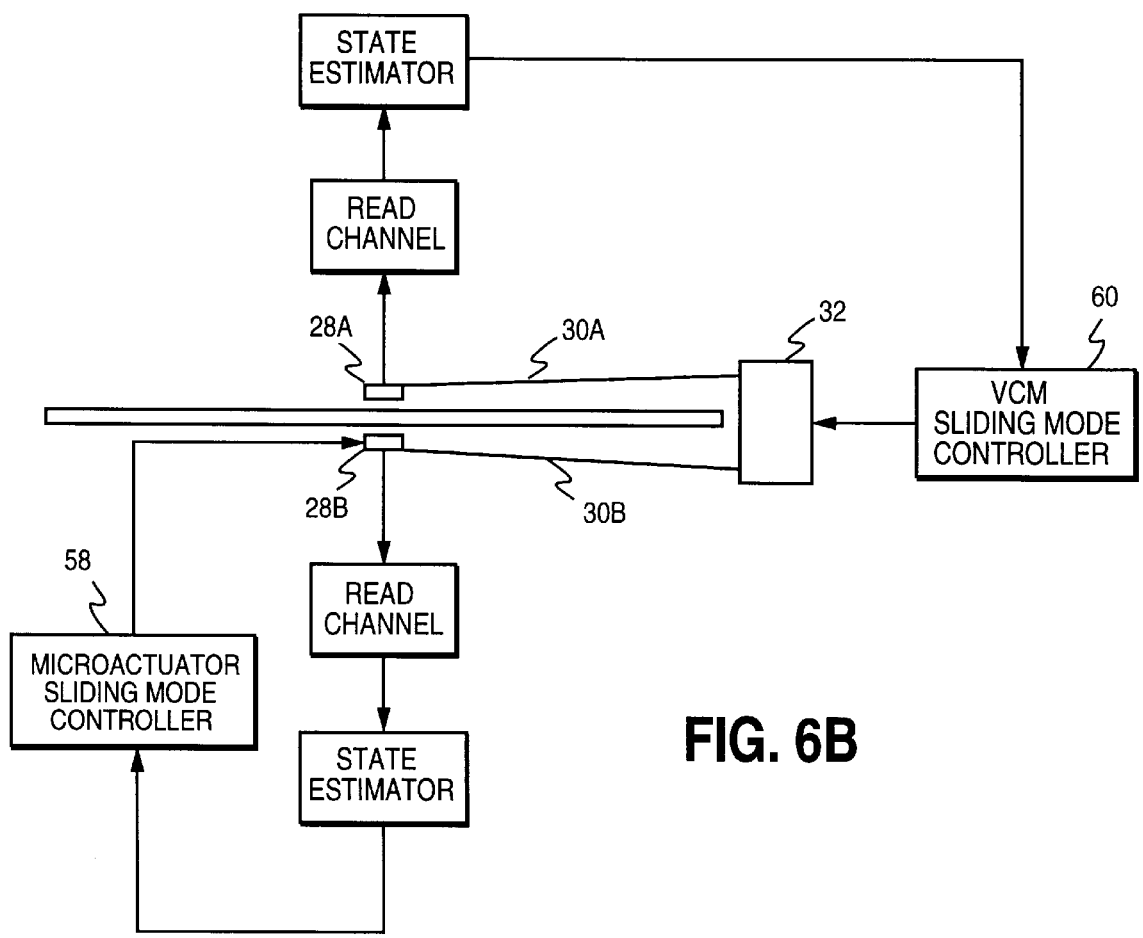
FIG. 6B is a block diagram showing a first sliding mode controller for controlling the VCM actuator and fine position of the top recording head, and a second sliding mode controller for controlling the bottom microactuator and fine position of the bottom recording head.

FIG. 6B shows the embodiment of the present invention employing a single sliding mode control microactuator 58 for tracking the bottom recording head 28B, and a VCM sliding mode controller 60 for controlling the seeks for both recording heads and the tracking of the top recording head 28B. This embodiment is less complex than that of FIG. 6A because it requires one less microactuator and sliding mode controller. Further, the VCM sliding mode controller 60 is simplified since there is no need to center top and bottom microactuators as described above with respect to FIG. 4B. This embodiment may not be feasible, however, if the range of the microactuator cannot account for the skew between the top and bottom tracks.

Figure 7A:
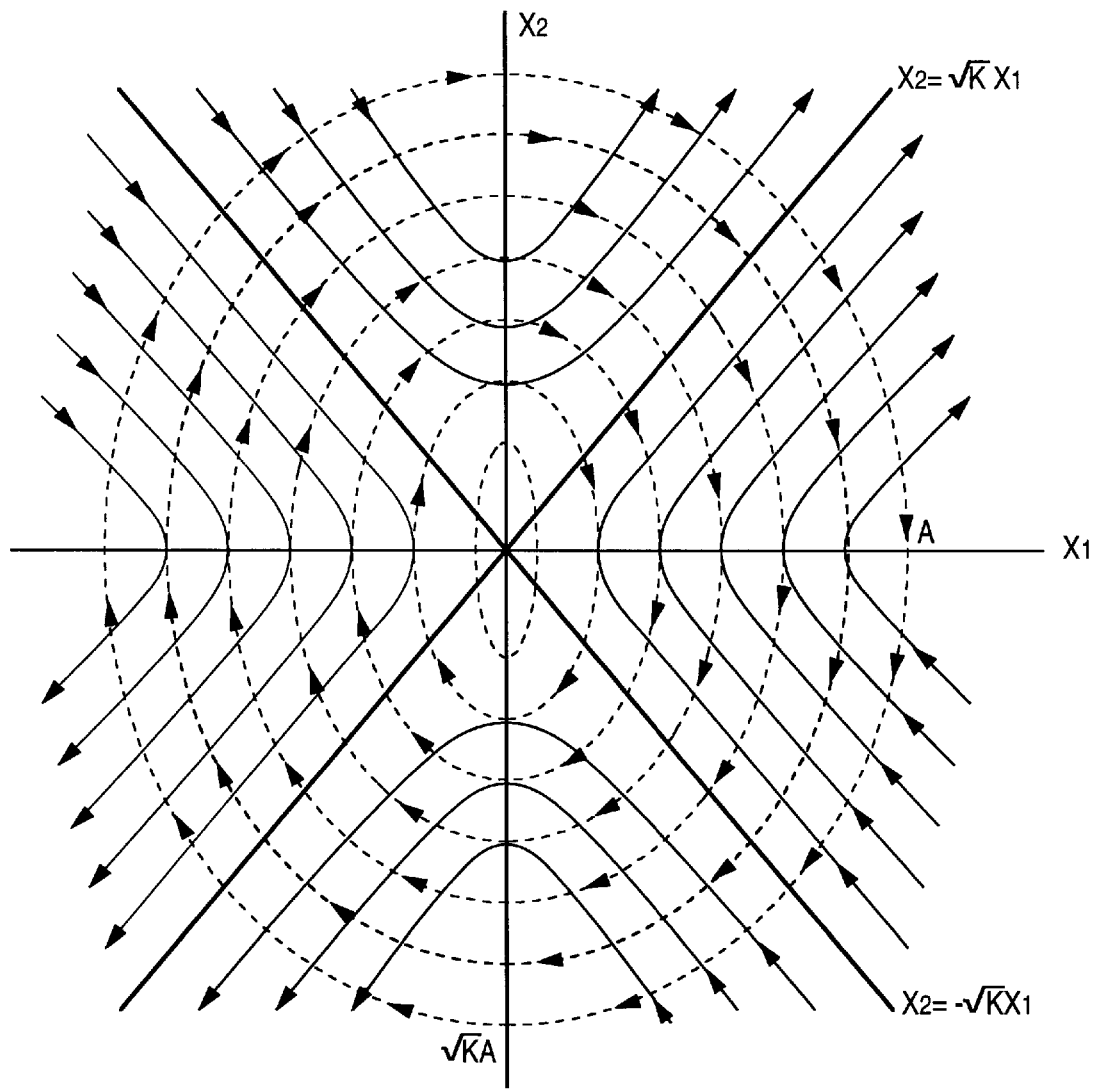
FIG. 7A–7C show the phase state trajectories associated with the sliding mode controllers of FIG. 6A and 6B.

FIGS. 7A–7D illustrate the basic aspects of the sliding mode controller of the present invention. A more detailed description of the sliding mode controller is provided in co-pending U.S. patent application Ser. No. 08/507,621 entitled "IMPROVED CHATTER REDUCTION IN SLIDING MODE CONTROL OF A DISK DRIVE ACTUATOR." In general, a sliding mode controller operates by switching between at least two structures, where each structure results in different phase state trajectories for the system. FIG. 7A shows a simple example of two phase state trajectories in a sliding mode controller. A first phase trajectory comprises a set of ellipses in a negative feedback structure (positive gain K), and second phase trajectory comprises a set of hyperbolas in a positive feedback structure (negative gain K). The representative phase states include the position error X1 and the position error velocity X2 (of the recording head).

Notice that in the individual structures, the system is unstable and the phase states X1 and X2 never reach the origin (the target). By defining a third trajectory that exists in the phase plane where the first and second phase trajectories intersect in opposite directions, the phase states can be forced to the origin by switching between the two structures in order to follow the third trajectory. The switching operation is understood with reference to FIG. 7B where the predetermined third phase trajectory is shown as a linear segment 62. When a new track is selected, the initial position error is at point A, and the control system is initially switched to select the positive gain (i.e., negative feedback). As the recording head begins to accelerate toward the selected track, the phase states follow the arc trajectory 64 of the negative feedback mode. When the phase states reach the beginning of the third phase trajectory 62 at the intersection point B, the sliding mode controller switches to the negative gain and the phase states begin to follow the hyperbola trajectory 66 of the positive feedback mode. When the phase states cross the third phase trajectory 62 at point C, the controller switches back to the positive gain to drive the phase states along arc 68 back toward the third phase trajectory 62. This switching action is repeated so that the phase states slide along the linear segment 62 toward the origin of the phase plane. When the phase states are within a predetermined minimum distance from the origin of the phase plane, the system switches to a tracking mode and the sliding mode controller repeatedly switches between positive and negative feedback in order to keep the phase states near the origin of the phase plane, thereby keeping the recording head aligned over the centerline of the selected track.

Figure 7B:
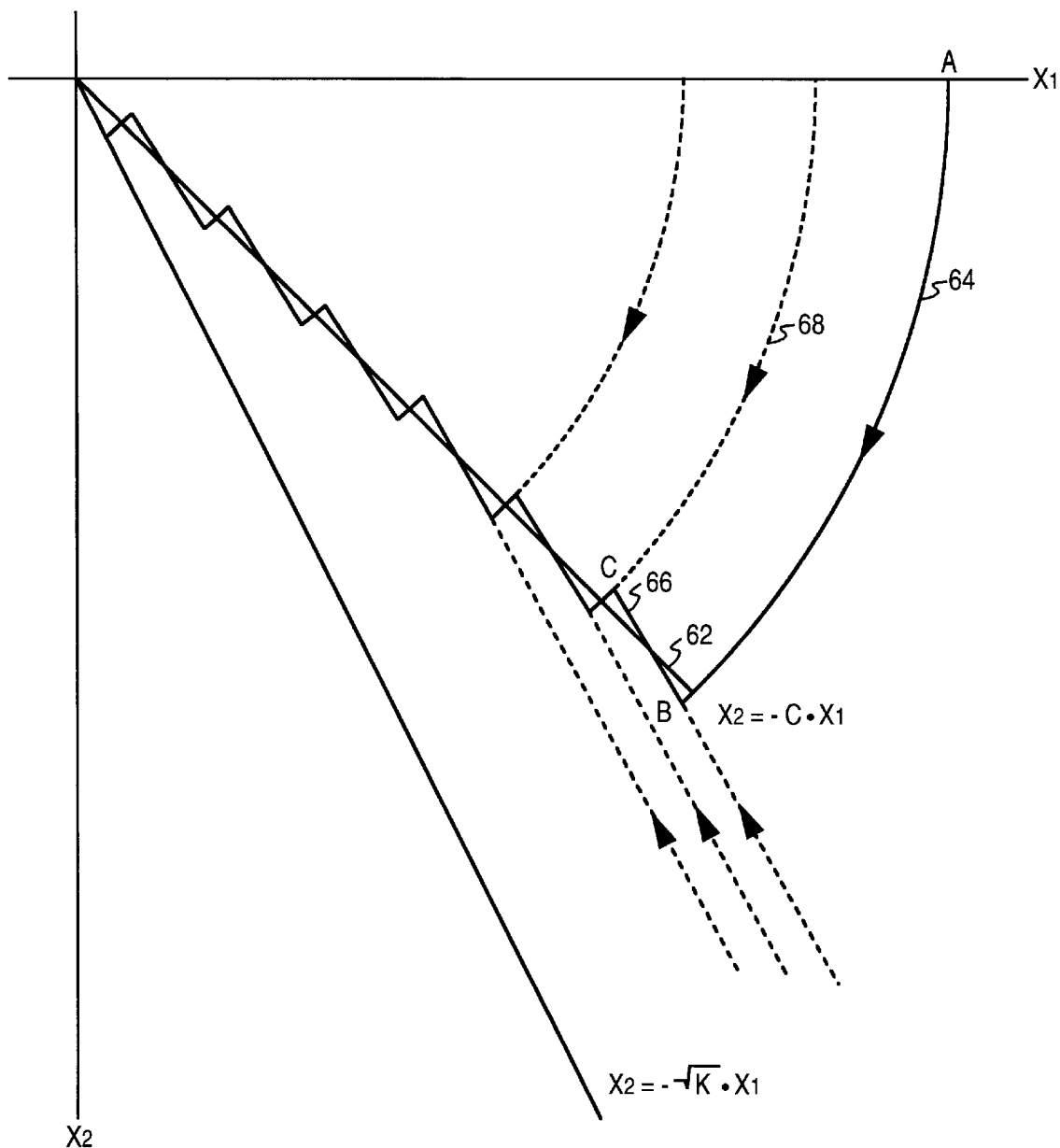

The time domain response of the control system when the phase states follow the sliding line of FIG. 7B is:

$$X1(t) = X1(t1)e^{-C(t-t1)}$$

where t1 is the time when the phase states reach the sliding line at point B. The above equation is the average response of the system along the sliding line and it is substantially unaffected by variations in the gain K or by external load disturbances. Consequently, it is not necessary to know the exact parameters of the system in order to determine the value for K. The above equation, together with the existence equation described below, prove that the system is globally stable within the sliding mode region.

The sliding mode controller determines when to switch between the positive and negative gains by observing the phase state values. The linear phase trajectory of FIG. 7B is defined by:

$$X2 = -C \cdot X1$$

where the constant C is the slope of the linear segment 62. By observing the phase states, the sliding mode controller switches the gains so that:

$$\sigma = X2 + C \cdot X1 = 0.$$

The sliding mode controller switches to the positive gain when $\sigma \cdot X1 > 0$ and to the negative gain when $\sigma \cdot X1 < 0$ in order to drive the phase states toward the linear trajectory.

The overall response of the system is made faster by increasing the slope of the sliding line (i.e., increasing C). However, an important limitation in sliding mode control is that the third phase trajectory must be constrained to a region in the phase plane where the positive and negative feedback phase trajectories intersect in opposite directions. From FIG. 7B it follows that the slope of the sliding line must be constrained to $0 < C < \overline{K}$. A further relationship derived from this constraint is:

$$\lim\sigma \cdot d\sigma < 0\sigma \to 0 dt$$

This equation is known as the existence equation and is used to determine values for the positive and negative gains.

Figure 7C:
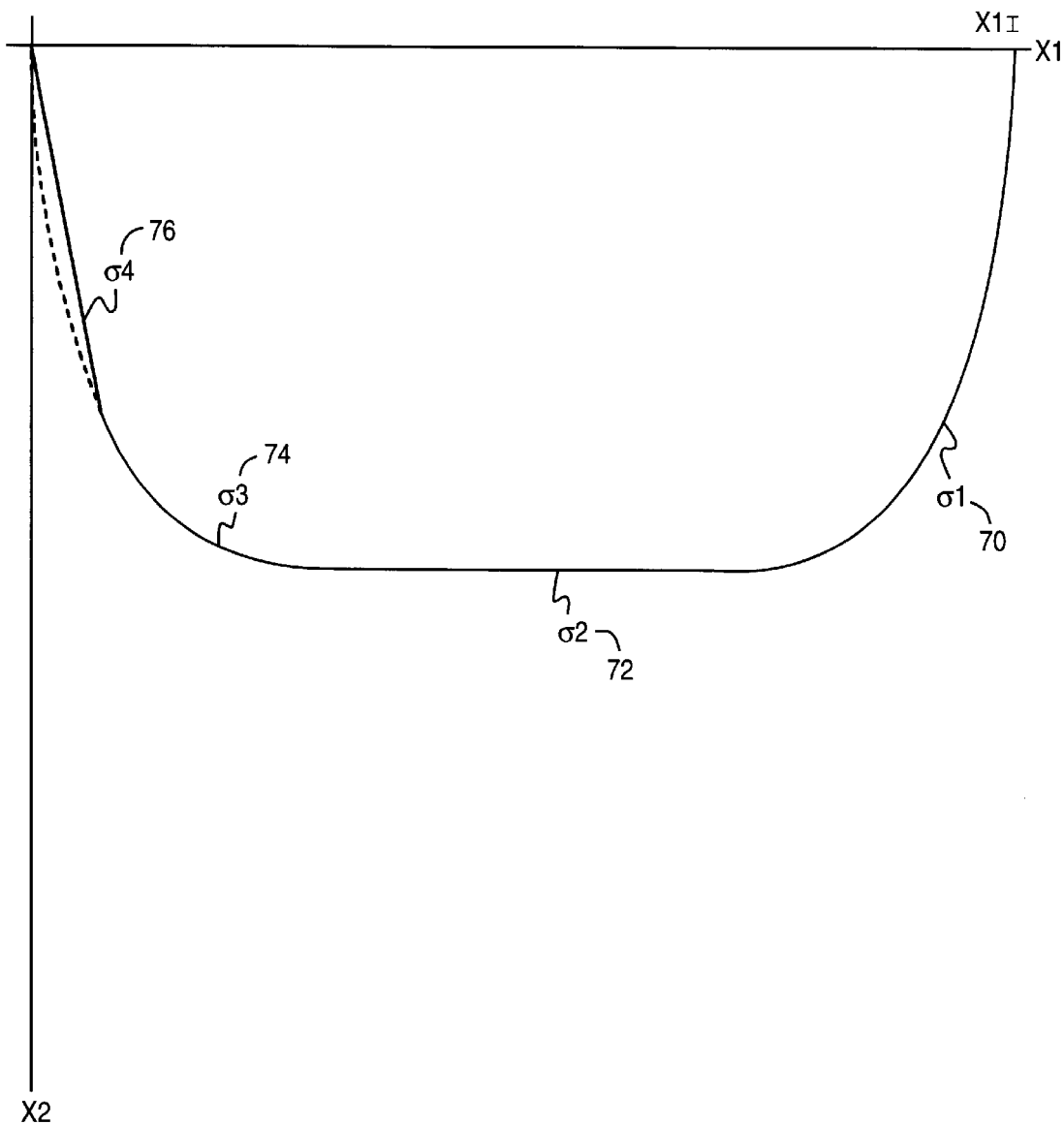

The linear sliding mode trajectory 62 of FIG. 7B has the disadvantage in that it initially operates in a linear feedback mode, and the initial arc trajectory 64 may drift due to parameter variation and external load disturbance. This problem is avoided by extending the sliding mode region of operation to cover the entire region of excursion. The optimum phase plane trajectory, and the preferred embodiment of the present invention, is illustrated in FIG. 7C. This trajectory comprises a substantially parabolic acceleration segment σ1 70, a linear constant velocity segment σ2 72, a second substantially parabolic deceleration segment σ3 74, and a linear deceleration segment σ4 76:

σ1=C1·X2²+X1−X1I;
σ2=X2−X2I;
σ3=−C2·X2²+X1;
σ4=X2+C3·X1; where:
    X1=the actuator position error phase state;
    X2=the actuator position error velocity phase state;
    C1=a predetermined acceleration constant;
    X1I=an initial actuator position error;
    X2I=a predetermined constant position error velocity;
    C2=a predetermined deceleration constant; and
    C3=a predetermined slope of the linear deceleration segment.

The linear deceleration segment σ4 76 is necessary because the slope of the parabolic deceleration segment σ3 74 becomes too steep near the origin to support sliding mode (i.e., the deceleration becomes too large). The linear constant velocity segment σ2 72 is not necessary if the inter-track seek distance is sufficiently short (i.e., the phase states will transition from σ1 directly to σ3 if the initial position error is less than a predetermined threshold). Thus, the sliding mode controller switches between at least two structures such that the phase states slide along each segment of the phase trajectory shown in FIG. 7C.

Figure 7D:
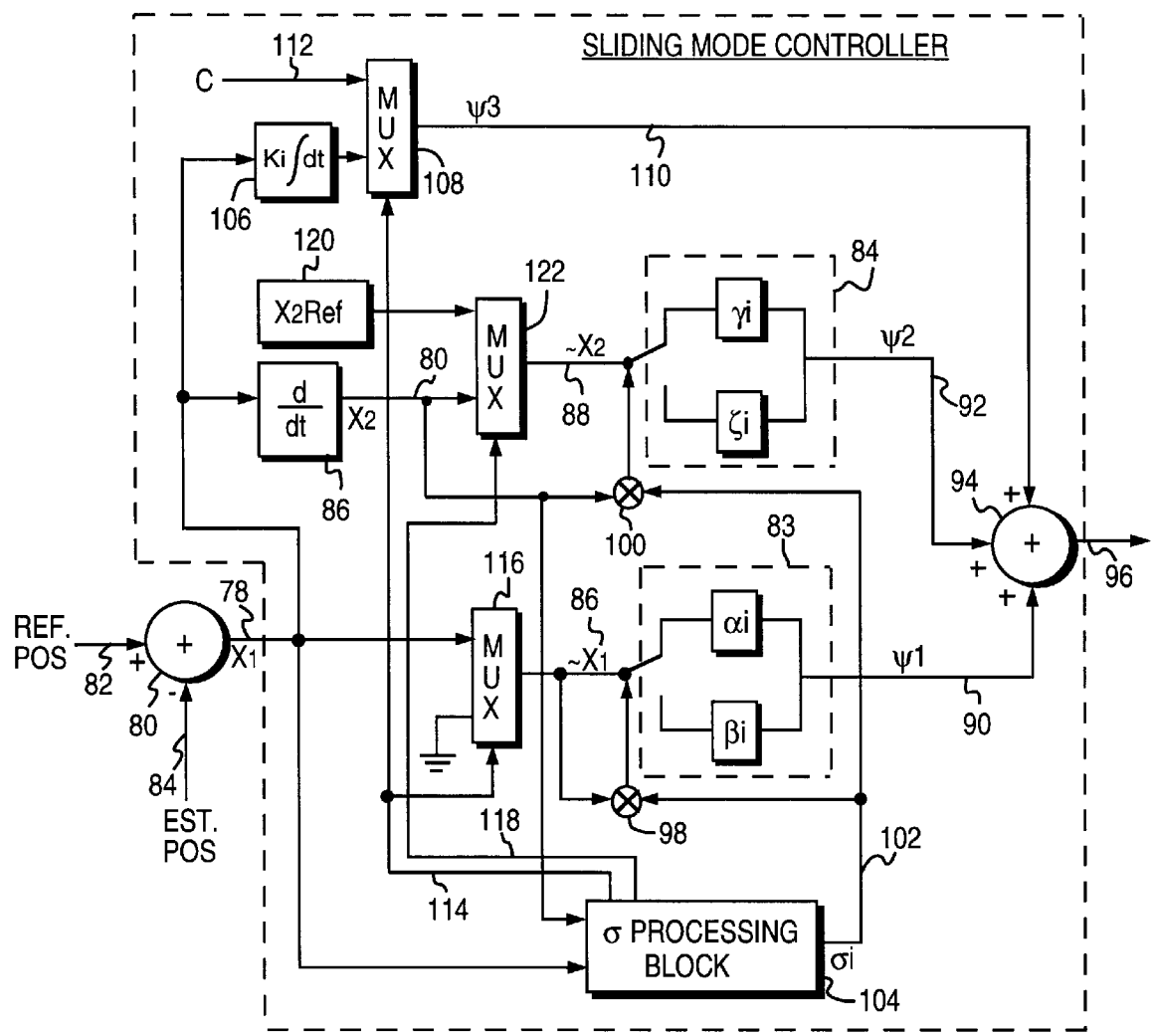
FIG. 7D is a block diagram of a sliding mode controller of the present invention.

FIG. 7D is a detailed diagram of the sliding mode control system of the present invention. An actuator position error X1 78 is generated at adder 80 as the difference between a reference or target position 82 and an estimated current position 84. A differentiator 86 differentiates the actuator position error X1 78 to generate an actuator position error velocity signal X2 80. In an alternative embodiment not shown, a state estimator generates the position error velocity X2 80. Two switching gain circuits 83 and 84 multiply the position error ~X1 86 and error velocity ~X2 88 control signals, respectively, to generate control signals ψ1 90 and ψ2 92 which are added at adder 94 to generate the actuator control signal 96.

Multipliers 98 and 100, responsive to the phase states ~X1 86 and X2 80 and the current trajectory segment σi 102, control the switching operation of the gain circuits 83 and 84. The sign of the resulting multiplication determines the state of the switch so as to drive the phase states X1 and X2 toward the predetermined sliding line trajectory shown in FIG. 7C. Thus, multipliers 98 and 100 can be implemented simply as the exclusive-or of the sign bit of the operands. A a processing block 104, responsive to the phase states X1 and X2, implements the trajectory segment switching logic to determine which segment σi of the phase trajectory of FIG. 7C the phase states are to follow.

At the end of a seek operation when the recording head reaches the target track, several biasing forces can cause the recording head to have a steady state DC offset from the centerline. Typical biasing forces include the radial component of the windage caused by the rotating disks, tilt of the disk stack, biases in the flexible cables, and electrical offsets. To compensate for these biasing forces and drive the steady state position error to zero, an integrator 106 integrates the position error phase state X1 78 and its output, selected through multiplexer 108 and applied over line 110, is summed 94 into the output 96 of the sliding mode controller. The biasing forces do not vary with time, however, they do vary with the radial position of the recording head. Therefore, the steady state integration value 110 corresponding to the biasing forces for each track is stored in memory. When seeking to a selected new track, the integrator 106 is disabled and the steady state integration value stored in memory corresponding to the selected new track is added 94 as a constant 112 to the control signal (i.e., selected as the output of multiplexer 108). When the recording head reaches the selected new track and the head has settled sufficiently, the integrator 106 is re-enabled (and selected as the output of multiplexer 108) and added 94 back into the control signal.

In order to reduce switching noise during a seek operation, the position error phase state X1 78 is switched out of the sliding mode control. The σ processing block 104 selects, over line 114, the ground plane as the output of multiplexor 116. As a result, ~X1 86 is set to zero in order to disable the switching action of multiplier 98 and to remove the contribution of ψi 90 from the computation of the control signal 96 at the output of adder 94. Because the position error phase state ~X1 86 is disabled, the velocity phase state ~X2 88 is initialized to a predetermined value to ensure the actuator begins moving in the desired direction (i.e., moving toward the selected track). To accomplish this, the σ processing block 104 selects, over line 118, X2Ref 120 as the output of multiplexor 122. When the position error velocity X2 80 reaches a predetermined speed (X2Ref 120), the σ processing block 104 selects, over line 118, X2 80 as the output of multiplexor 122 (setting ~X2=X2).

The various gain values in switching gain blocks 83 and 84 of FIG. 7D are programmably set to appropriate values according to the trajectory segment being followed by the phase states and whether the controller is executing a forward or reverse seek. Using the existence equation and the phase state trajectory equations, appropriate ranges for the gain values for each segment of the phase state trajectory shown in FIG. 7C can be determined. To further simplify the operation of the controller, the gain values are selected as binary coefficients. That is, the various gain values in switching gain blocks 83 and 84 are selected from the set $2^n$, where n is a positive or negative integer. Binary coefficients may be used for the switching gains because the gains need only be within a predetermined range as discussed above. Consequently, the memory requirements for storing the coefficients is reduced and complex hardware multipliers are obviated; that is, multiplying by binary coefficients is accomplished using only shift registers.

Conventional Sampled Amplitude Read Channel

Figure 8:
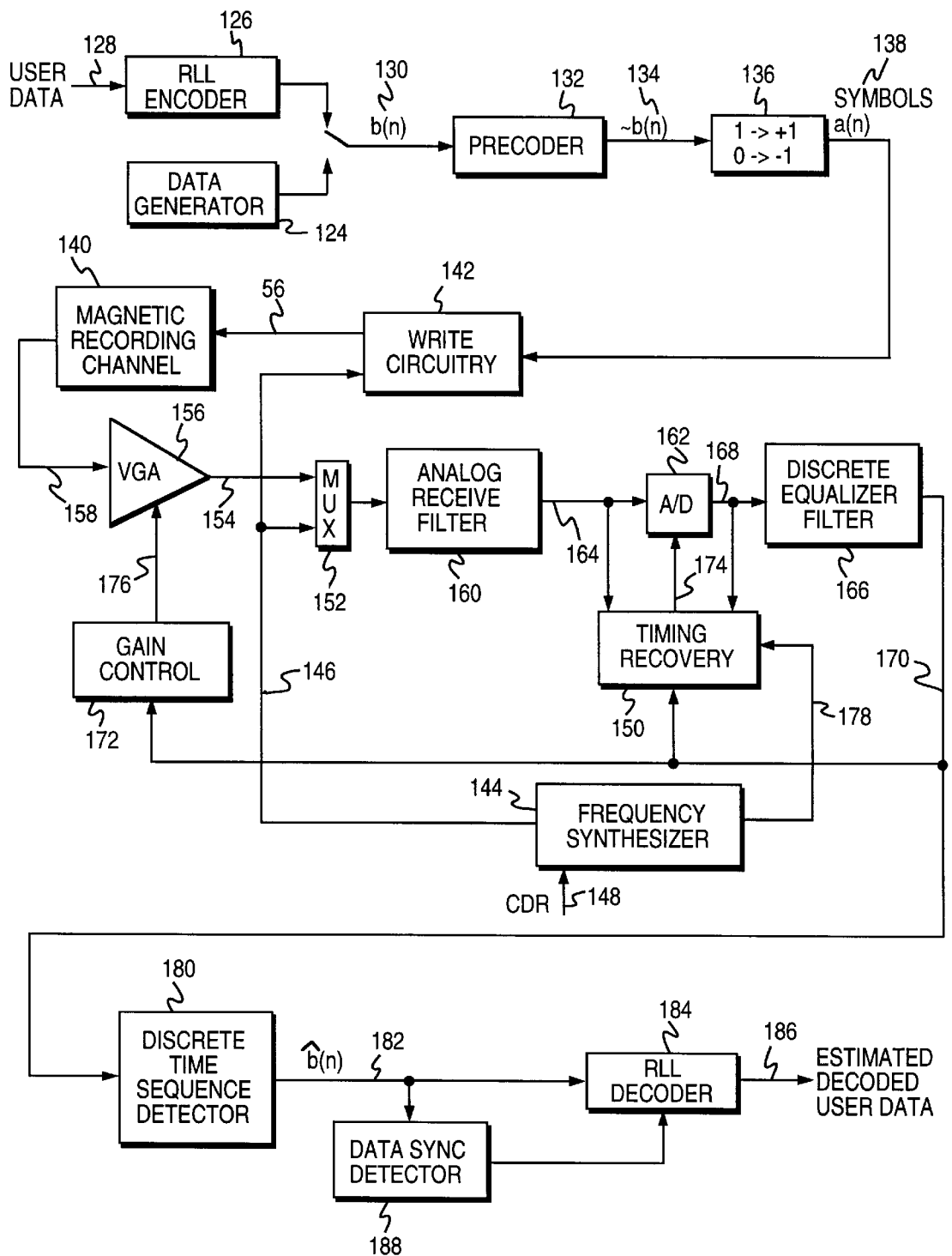
FIG. 8 shows a prior art sampled amplitude read channel employing conventional synchronous sampling timing recovery.

Referring now to FIG. 8, shown is a detailed block diagram of a conventional sampled amplitude read channel. During a write operation, a data generator 124 outputs the preamble data 10 and the primary and secondary sync marks 12A and 12B recorded on the disc prior to recording the user data 24 (see FIG. 1C). An RLL encoder 126 encodes the user data 128 into a binary sequence b(n) 130 according to an RLL constraint. A precoder 132 precodes the binary sequence b(n) 130 in order to compensate for the transfer function of the recording channel 140 and equalizer filters to form a precoded sequence ~b(n) 134. The precoded sequence ~b(n) 134 is converted into symbols a(n) 138 by translating 136 ~b(N)=0 into a(N)=−1, and ~b(N)=1 into a(N)=+1. Write circuitry 142, responsive to the symbols a(n) 138, modulates the current in the recording head coil at the baud rate 1/T to record the binary sequence onto the medium. A frequency synthesizer 144 provides a baud rate write clock 146 to the write circuitry 142 and is adjusted by a channel data rate signal (CDR) 148 according to the zone the recording head is over.

When reading the recorded binary sequence from the medium, timing recovery 150 first locks to the write frequency by selecting, as the input to the read channel, the write clock 146 through a multiplexor 152. Once locked to the write frequency, the multiplexor 152 selects the signal 154 from the read head as the input to the read channel in order to frequency and phase lock to the acquisition preamble 10 recorded on the disc preceding the recorded user data 24. A variable gain amplifier 156 adjusts the amplitude of the analog read signal 158, and an analog filter 160 provides initial equalization toward the desired response as well as attenuating aliasing noise. A sampling device 162 samples the analog read signal 164 from the analog filter 160, and a discrete time equalizer filter 166 provides further equalization of the sample values 168 toward the desired response. In partial response recording, for example, the desired response is often selected from Table 1:

TABLE 1

| Channel | Transfer Function | Dipulse Response |
|---------|-------------------|------------------|
| PR4     | (1 − D) (1 + D)   | 0, 1, 0, −1, 0, 0, 0, . . |
| EPR4    | (1 − D) (1 + D)$^2$ | 0, 1, 1, −1, −1, 0, 0, . . . |
| EEPR4   | (1 − D) (1 + D)$^3$ | 0, 1, 2, 0, −2, −1, 0, . . . |

After equalization, the equalized sample values 170 are applied to a decision directed gain control 172 and timing recovery 150 circuit for adjusting the amplitude of the read signal 158 and the frequency and phase of the sampling device 162, respectively. Timing recovery 150 adjusts the frequency of sampling device 162 over line 174 in order to synchronize the equalized samples 170 to the baud rate, and gain control 172 adjusts the gain of variable gain amplifier 156 over line 176 in order to match the magnitude of the channel's frequency response to the desired partial response. Frequency synthesizer 144 provides a course center frequency setting to the timing recovery circuit 150 over line 178 in order to center the timing recovery frequency over temperature, voltage, and process variations.

The equalized samples Y(n) 170 are ultimately input into a discrete time sequence detector 180, such as a maximum likelihood (ML) Viterbi sequence detector, which detects an estimated binary sequence ^b(n) 182 from the sample values. The servo data may be detected using the discrete time sequence detector 180 or, alternatively, using a discrete time pulse detector (not shown). An RLL decoder 184 decodes the estimated binary sequence ^b(n) 182 from the sequence detector 180 into estimated user data 186. A data sync detector 188 detects the sync marks 12 (shown in FIG. 1B) in order to frame operation of the RLL decoder 184.

The conventional sampled amplitude read channel shown in FIG. 8 could be used in a multiple actuator disc drive such as the system described in the above referenced U.S. Pat. No. 5,355,486. It would require duplicating all of the analog and digital components except for the frequency synthesizer 144. A drawback with such a design, however, are the potential obstacles in integrating the duplicated channels into one piece of silicon and, in particular, the problems associated with synchronous sampling timing recovery. As described in greater detail below with reference to FIG. 11A, synchronous sampling timing recovery synchronizes the frequency of a variable frequency oscillator (VFO) to the baud rate. The output of the VFO 174 clocks the sampling device 162 as well as the other digital components of the read channel. In a multiple read channel system, the timing recovery VFOs would operate at slightly different frequencies (or significantly different if reading from multiple zones) which can result in cross talk between the VFOs if integrated into a single piece of silicon. Furthermore, the digital components of each read channel would be clocked at a different frequency due to the difference between the VFO frequencies, thereby inducing switching noise into the read signal and degrading the performance of sequence detection.

Multiple Integrated Read Channels

The present invention overcomes the drawbacks of integrating multiple read channels into a single integrated circuit by replacing the synchronous sampling timing recovery of the conventional read channel shown in FIG. 8 with interpolated timing recovery. Interpolated timing recovery does not use a VFO to generate a sampling clock, which eliminates noise due cross talk. Furthermore, a frequency synthesizer generates a single reference clock for synchronously clocking all of the digital circuitry in the multiple read channels, thereby minimizing switching noise.

Figure 9:
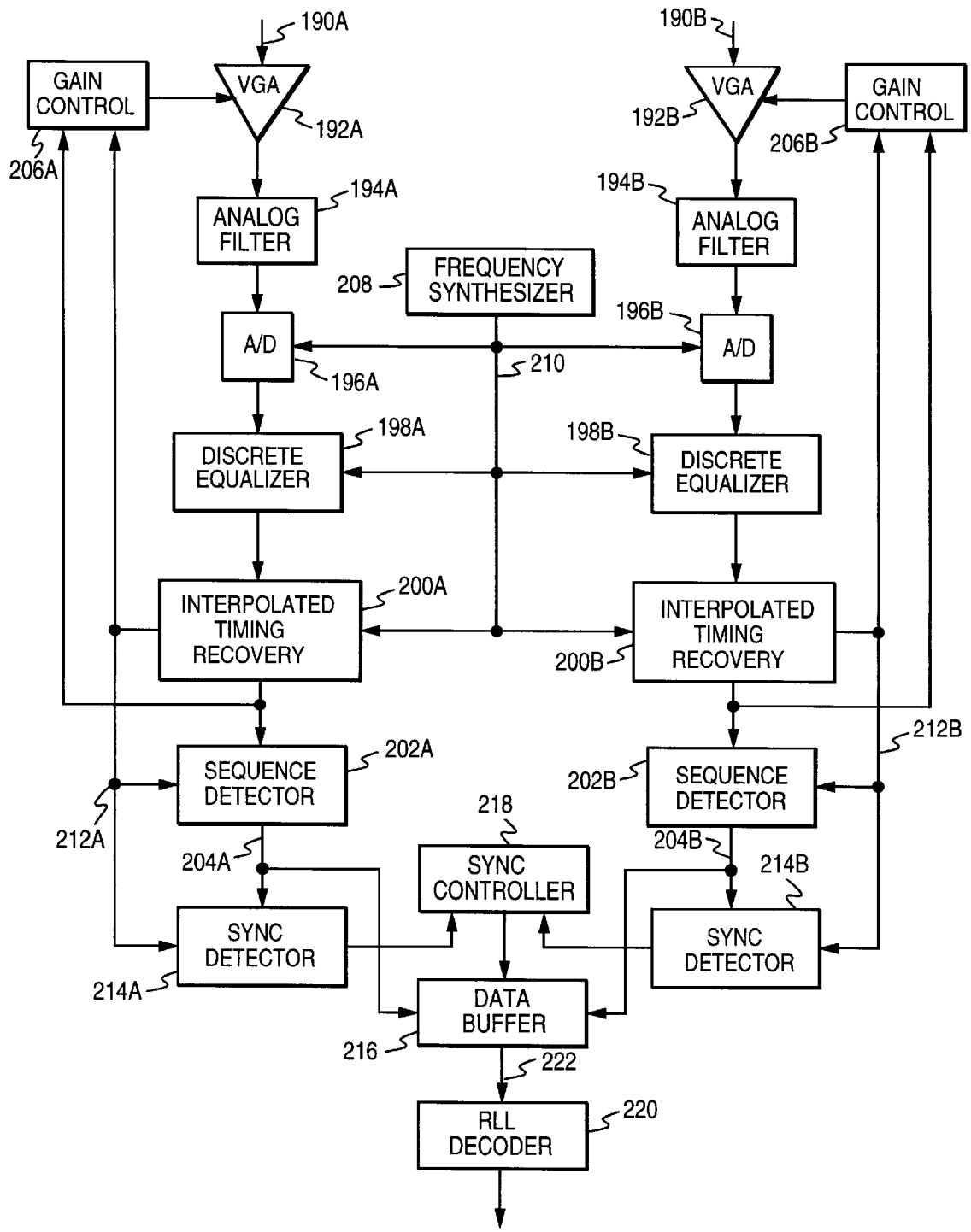
FIG. 9 is a block diagram of a dual path read channel of the present invention employing a single frequency synthesizer for generating a reference clock for clocking operation of the sampling devices, discrete equalizers, and interpolated timing recovery, thereby facilitating a single integrated circuit design.

An overview of the multiple data stream read channel of the present invention is shown in FIG. 9. The example of FIG. 9 shows parallel processing of two read signals 190A and 190B from two recording heads (e.g., top and bottom recording heads), but in general the circuitry could be duplicated to process N read signals in parallel. The read signals are amplified by respective variable gain amplifiers (VGA) (192A,192B), filtered by analog receive filters (194A, 194B), and asynchronously sampled by analog-to-discrete time converters (196A,196B). The asynchronous sample values are equalized by respective discrete time equalizers (198A,198B) according to a desired partial response (e.g., a response selected from Table 1), and the equalized sample values input into interpolated timing recovery (ITR) circuits (200A,200B) for generating interpolated sample values substantially synchronized to the baud rate. The synchronous sample values output by the ITR circuits (200A,200B) are input into respective discrete time sequence detectors (202A,202B) which detect respective estimated data sequences (204A,204B). The synchronous sample values are also input into respective gain control circuits (206A,206B) for controlling the gain of the analog read signals (190A,190B) via the VGAs (192A, 192B).

A single frequency synthesizer 208 generates a reference clock 210 for clocking operation of the sampling devices (196A,196B), discrete time equalizers (198A,198B), and ITR circuits (200A,200B). The ITR circuits (200A,200B) generate respective data clocks (212A,212B) for clocking operation of the gain control circuits (206A,206B), sequence detectors (202A,202B), and sync mark detectors (214A, 214B) at a frequency relative to the baud rate. As described below with reference to FIG. 11B, the data clocks (212A, 212B) are generated from the reference clock 210 (with certain cycles masked); so, in fact, the reference clock 210 is actually clocking all of the discrete time circuitry for both channels. Again, this reduces the switching noise that would otherwise occur if the read channels were clocked independently using the conventional timing recovery technique of FIG. 8.

The estimated data sequences (204A,204B) are input into respective sync mark detectors (214A,214B) for detecting the primary and secondary sync marks 12A and 12B of FIG. 1C. The estimated data sequences (204A,204B) are also stored in a data buffer 216. A sync controller 218 controls the data flow into and out of the data buffer 216 in response to control signals generated by the sync mark detectors (214A, 214B). An RLL decoder 218 decodes the data as they are transferred out of the data buffer 216 and to the disc controller 38 of FIG. 2. An advantage to using a single RLL decoder 220 for decoding both estimated data sequences (204A,204B) is obviously the cost savings of less circuitry, but it also facilitates "dropping in" the read channel of FIG. 9 into existing single data path storage systems. In other words, with the addition of a microactuator and sliding mode controller (see FIG. 6B), the read channel of FIG. 9 in effect doubles the transfer rate of the storage device without significantly modifying the rest of the system.

Figure 10A:
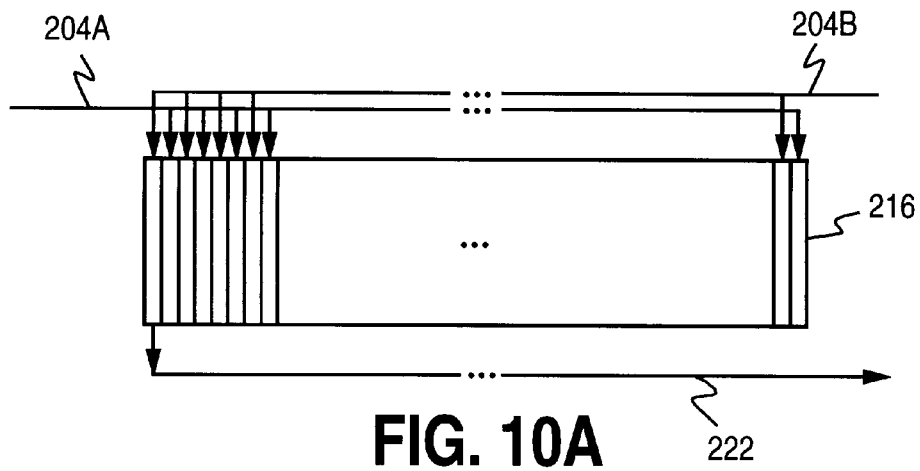
FIG. 10A–10C show various implementations of the data buffer of FIG. 9 for simultaneously storing the estimated data sequences output by the sequence detectors, as well as for implementing retroactive synchronization.

The preferred embodiment for the data buffer 216 in the read channel of FIG. 9 depends on the data format and whether or not retroactive synchronization is employed. FIG. 10A shows the preferred embodiment of the data buffer 216 when using the data format of FIG. 5C (i.e., when the symbols of a logical sectors are interleaved between the top and bottom physical sectors) and when not employing retroactive synchronization. The symbols are de-interleaved by storing the estimated data sequences (204A,204B) in the even and odd interleaves of the data buffer, respectively. The symbols are then transferred out of the data buffer 216 over line 222 and transferred to the RLL decoder 220. The configuration of FIG. 10A minimizes the necessary buffer size—only a number of data symbols necessary to account for the skew between the top and bottom tracks need to be buffered. The skew may be only a few bytes, depending on the tolerances of the system, which means the buffer could be implemented as a small FIFO or circular buffer.

Figure 10B:
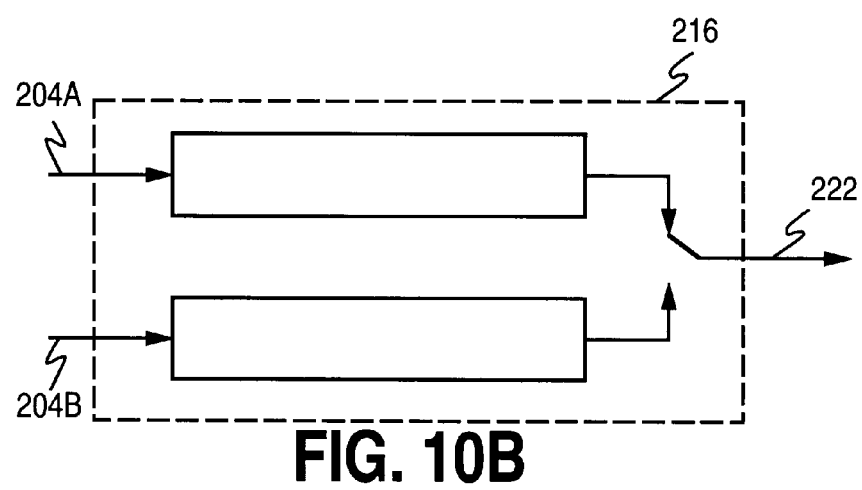

If retroactive synchronization is employed with the data format of FIG. 5C, then the preferred embodiment of the data buffer 216 is shown in FIG. 10B. In this configuration, individual buffers are connected to receive each estimated data sequence (204A,204B) to facilitate retroactive synchronization when the secondary sync mark 12B of FIG. 1C is detected. Thus, the individual data buffers must be large enough to hold the user data 24 between the primary sync mark 12A and the secondary sync mark 12B, as well as account for the skew between the top and bottom tracks. The necessary buffer size for this configuration is still relatively small compared to buffering an entire sector.

Figure 10C:
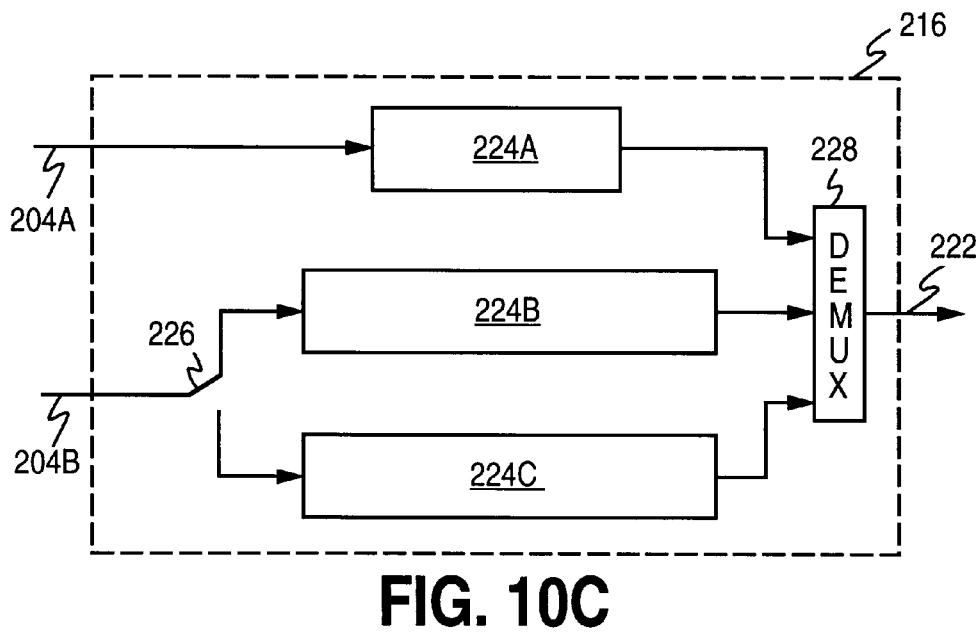

FIG. 10C shows the preferred embodiment of the data buffer 216 when using the data formats of FIG. 5A and 5B. This configuration uses three buffers (224A,224B,224C), where buffers 224B and 224C have enough capacity to store an entire physical sector and buffer 224A has enough capacity to implement retroactive synchronization, if implemented, and to account for the delay in transferring a previously buffered sector to the disc controller 38. Switches 226 and 228 switch between buffers 224B and 224C to alternately store and retrieve the estimated data sequence 204B representing the physical sectors stored in the bottom track.

When the data format of FIG. 5A is employed, buffer 224A buffers the even logical sectors (i.e., the top physical sectors), and buffers 224B and 224C buffer the odd logical sectors (i.e., the bottom physical sectors) in an alternating manner. For instance, when reading the logical sectors shown in FIG. 5A in a consecutive sequence, the read heads pass simultaneously over logical sectors 0 and 1. Sector 0 is buffered by buffer 224A of FIG. 10C to implement retroactive synchronization, and then immediately decoded 220 and transferred to the disc controller 38 as the remainder of the sector is read from the disc. On the other hand, all of sector 1 is buffered in buffer 224B of FIG. 10C. Then, as sectors 2 and 3 are read, sector 1 is transferred out of buffer 224B, decoded 220, and sent to the disc controller 38. Sector 2 is buffered in buffer 224A and then transferred to the disc controller 38 following the transfer of sector 1, while sector 3 is buffered entirely in buffer 224C. While reading the next two logical sectors, 4 and 5, sector 3 is transferred out of buffer 224C, decoded 220, and sent to the disc controller 38. Sector 4 is buffered in buffer 224A and transferred to the disc controller 38 following the transfer of sector 3, while sector 5 is buffered entirely in buffer 224B. This switching between buffers 224B and 224C continues as the remainder of the track is read.

Similarly, when the data format of FIG. 5B is employed, buffer 224A buffers the first part of the logical sector (i.e., the physical sectors in the top track), and buffers 224B and 224C buffer the second part of the logical sector (i.e., the physical sectors in the bottom track) in an alternating manner. For instance, when reading the logical sectors shown in FIG. 5B in a consecutive sequence, the read heads pass simultaneously over sector $0_A$ and $0_B$. Sector $0_A$ is buffered by buffer 224A of FIG. 10C to implement retroactive synchronization, and then immediately decoded 220 and transferred to the disc controller 38 as the remainder of the sector is read from the disc. On the other hand, all of sector $0_B$ is buffered in buffer 224B of FIG. 10C. Then, as sectors $1_A$ and $1_B$ are read, sector $0_B$ is transferred out of buffer 224B, decoded 220, and sent to the disc controller 38. Sector $1_A$ is buffered in buffer 224A and then transferred to the disc controller 38 following the transfer of sector $0_B$, while sector $1_B$ is buffered entirely in buffer 224C. While reading the next two sectors, $2_A$ and $2_B$, sector $1_B$ is transferred out of buffer 224C, decoded 220, and sent to the disc controller 38. Sector $2_A$ is buffered in buffer 224A and transferred to the disc controller 38 following the transfer of sector $1_B$, while sector $2_B$ is buffered entirely in buffer 224B. This switching between buffers 224B and 224C continues as the remainder of the track is read.

Conventional Timing Recovery

Figure 11A:
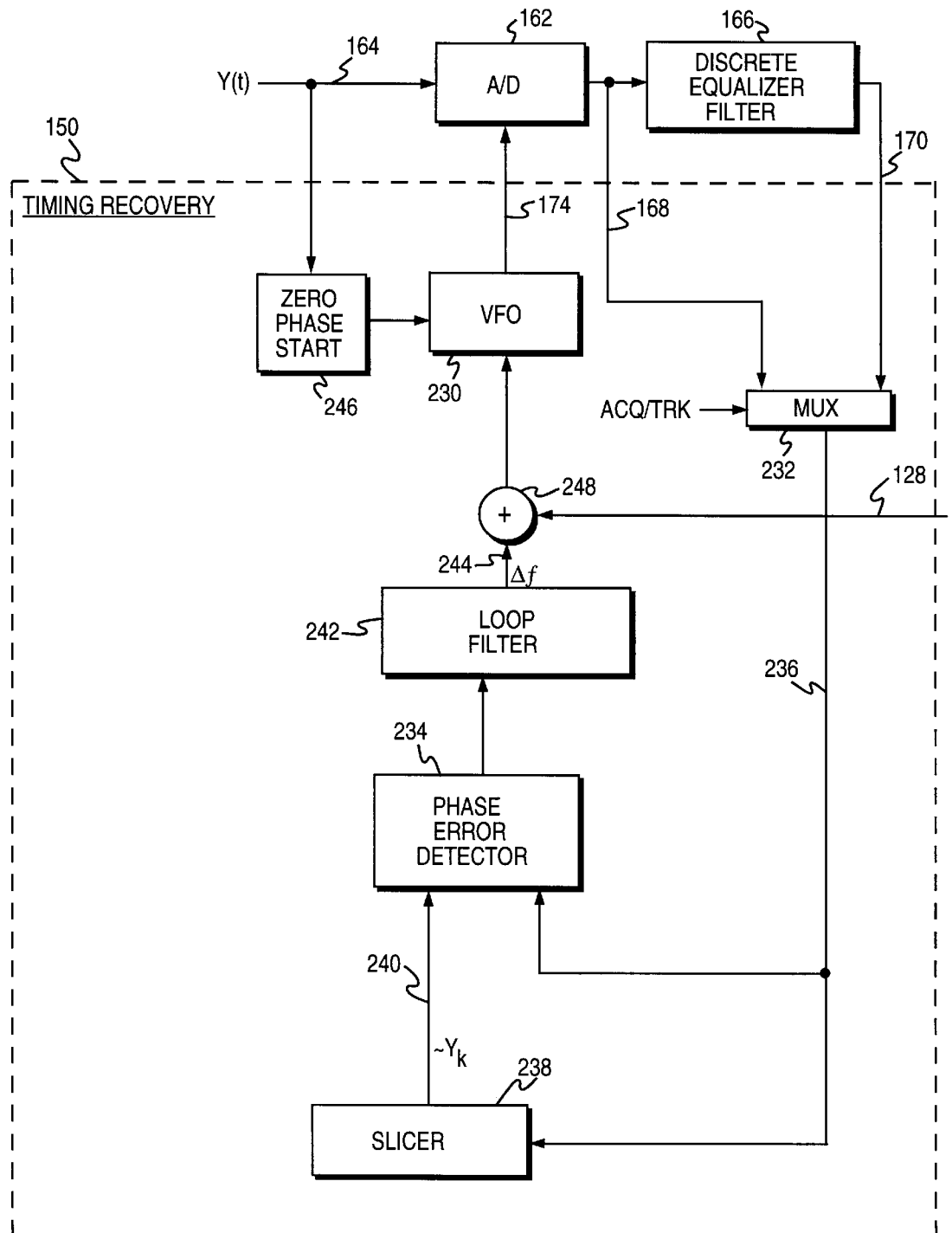
FIG. 11A is a block diagram showing the operation of a conventional synchronous sampling timing recovery circuit.

An overview of the conventional sampling timing recovery circuit 150 of FIG. 8 is shown in FIG. 11A. The output 174 of a variable frequency oscillator (VFO) 230 controls the sampling clock of the sampling device 162 which is typically an analog-to-digital converter (A/D) in digital read channels. A multiplexor 232 selects the unequalized sample values 168 during acquisition and the equalized sample values 170 during tracking, thereby removing the discrete equalizer filter 166 from the timing loop during acquisition in order to avoid its associated latency. A phase error detector 234 generates a phase error in response to the sample values received over line 236 and estimated sample values $\sim Y_k$ from a sample value estimator 238, such as a slicer in a d=0 PR4 read channel, over line 240. A loop filter 242 filters the phase error to generate a frequency offset $\Delta f$ 244 that settles to a value proportional to a frequency difference between the sampling clock 174 and the baud rate. The frequency offset $\Delta f$ 244 is added 248 to the center frequency control signal 178 from the frequency synthesizer 144, and the output of adder 248 adjusts the sampling clock 174 at the output of the VFO 230 in order to synchronize the sampling to the baud rate.

A zero phase restart (ZPR) 246 circuit suspends operation of the VFO 230 at the beginning of acquisition in order to minimize the initial phase error between the sampling clock 174 and the read signal 164. This is achieved by disabling the VFO 230, detecting a zero crossing in the analog read signal 164, and re-enabling the VFO 230 after a predetermined delay between the detected zero crossing and the first baud rate sample.

Interpolated Timing Recovery

Figure 11B:
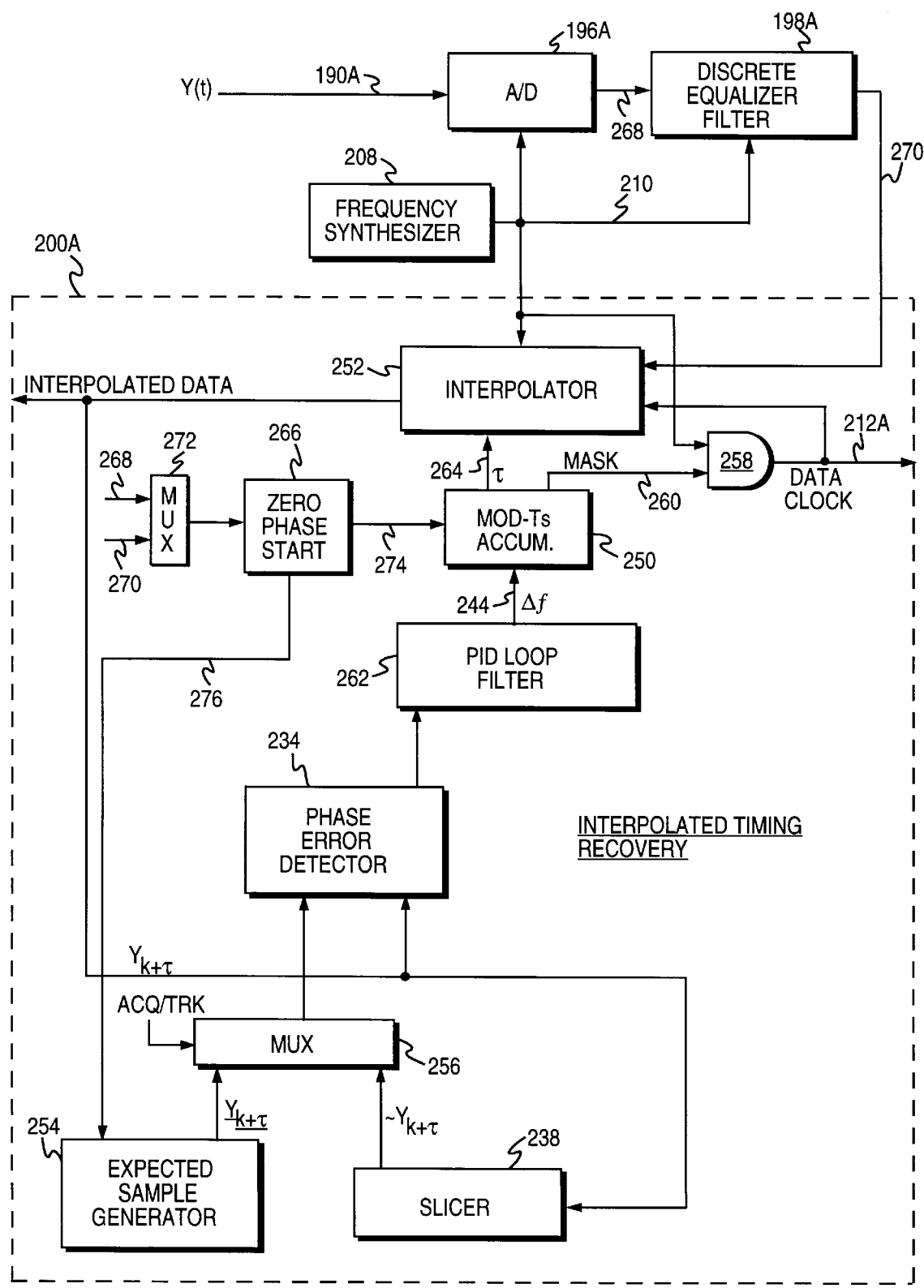
FIG. 11B is a block diagram showing the operation of the interpolated timing recovery circuit of the present invention.

Details of the interpolated timing recovery read channel including interpolator 200A of FIG. 9 are shown in FIG. 11B (the components of the other read channel(s) are duplicated). The VFO 230 in the conventional timing recovery of FIG. 11A is replaced with a modulo-Ts accumulator 250 and an interpolator 252. In addition, an expected sample value generator 254, generates expected samples $Y_{k+\tau}$ used by the phase error detector 234 to compute the phase error during acquisition. A multiplexor 256 selects the estimated sample values $\sim Y_{k+\tau}$ from the slicer 238 for use by the phase error detector 234 during tracking. The data clock 212A is generated at the output of an AND gate 258 in response to the sampling clock 210 and a mask signal 260 from the modulo-Ts accumulator 250 as discussed in further detail below. The phase error detector 234 and the slicer 238 process interpolated sample values at the output of the interpolator 252 rather than the channel sample values 170 at the output of the discrete equalizer filter 166 as in FIG. 11A. A PID loop filter 262 controls the closed loop frequency response, similar to the loop filter 242 of FIG. 11A, and generates a frequency offset signal $\Delta f$ 244. The frequency offset $\Delta f$ 244 is accumulated by the modulo-Ts accumulator 250 to generate an interpolation interval $\tau$ 264 for use by the interpolator 252 in computing the interpolated sample values substantially synchronized to the baud rate.

In the interpolated timing recovery of the present invention, locking a VFO to a reference frequency before acquiring the preamble is no longer necessary; multiplexing 152 the write clock 146 into the analog receive filter 160 (as in FIG. 8) is not necessary. Further, the sampling device 196A and the discrete equalizer filter 198A, together with their associated delays, have been removed from the timing recovery loop; it is not necessary to multiplex 232 around the equalizer filter 166 between acquisition and tracking (as in FIG. 11A). However, it is still necessary to acquire a preamble 10 before tracking the user data 24. To this end, a zero phase restart (ZPR) 266 minimizes the initial phase error between the interpolated sample values and the baud rate at the beginning of acquisition similar to the ZPR 246 of FIG. 11A. However, rather than suspend operation of a sampling VFO 230, the ZPR 266 for interpolated timing recovery computes an initial phase error $\tau$ from the A/D 196A sample values 268 or the equalized sample values 270 (as selected through multiplexer 272) and loads this initial phase error into the modulo-Ts accumulator 250 over line 274. The ZPR 266 for ITR also generates a control signal 276 for initializing the starting state of the expected sample generator 254.

The interpolator 252, as described in detail below, comprises a time varying FIR filter responsive to the interpolation interval $\tau$ 264 for computing the interpolated sample values. For more details concerning the PID loop filter 262, phase error detector 234, expected sample generator 254, and slicer 238, refer to U.S. patent applications Ser. No. 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control" and Ser. No. 08/701,572 entitled "Improved Timing Recovery For Synchronous Partial Response Recording." A detailed description of the modulo-Ts accumulator 250, data clock 212A, and interpolator 252 is provided in the next section.

Interpolator

Figure 12:
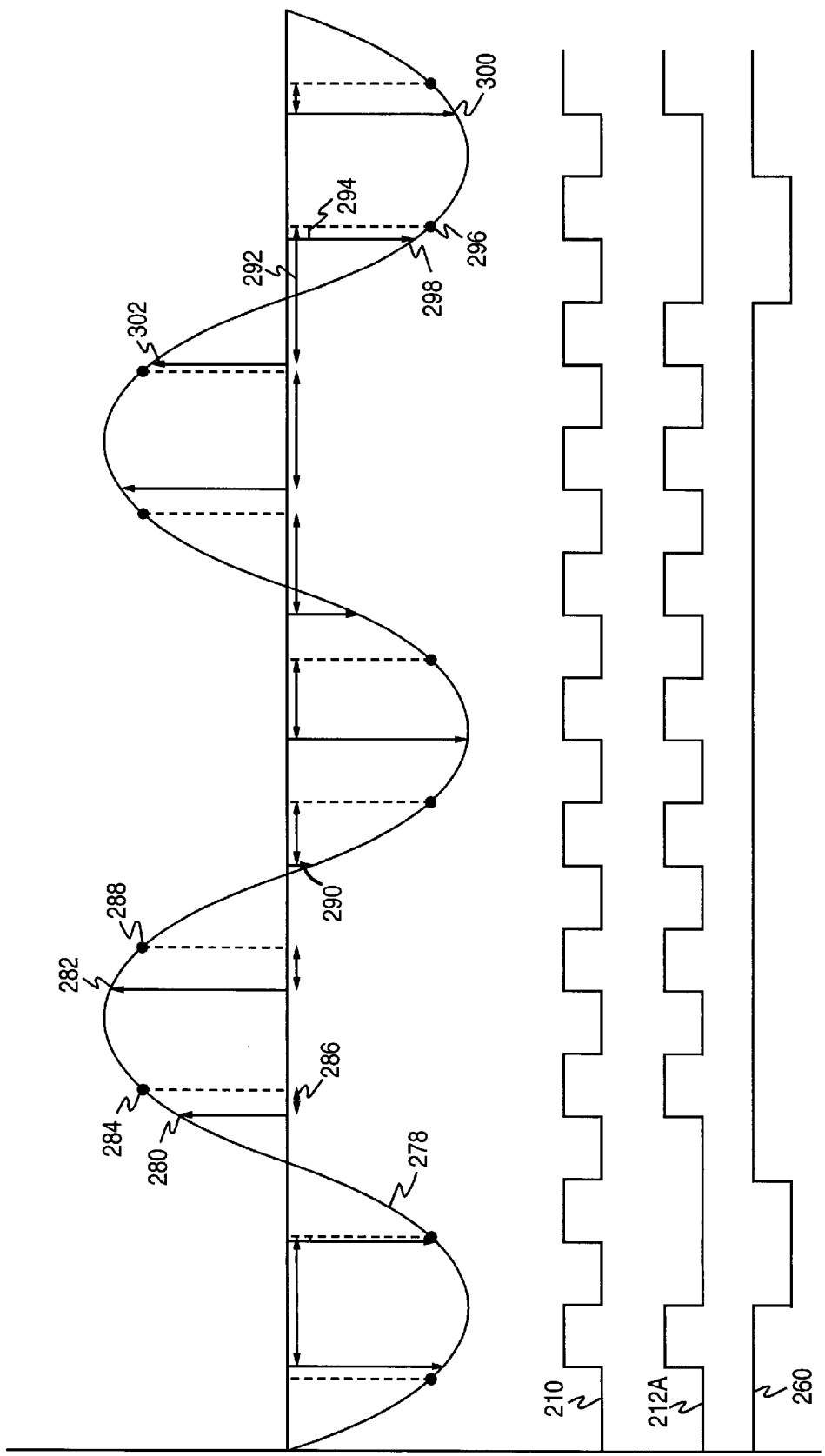
FIG. 12 illustrates the interpolation process of a sampled preamble signal, and a corresponding timing diagram that shows how the data clock is generated from the sampling clock.

The interpolator 252 of FIG. 11B is understood with reference to FIG. 12 which shows a sampled 2T acquisition preamble signal 278. The target synchronous sample values are shown as black circles and the asynchronous channel sample values as vertical arrows. Beneath the sampled preamble signal is a timing diagram depicting the corresponding timing signals for the sampling clock 210, the data clock 212A and the mask signal 260. As can be seen in FIG. 12, the preamble signal 278 is sampled slightly faster than the baud rate (the rate of the target values).

The function of the interpolator is to estimate the target sample value by interpolating the channel sample values. For illustrative purposes, consider a simple estimation algorithm, linear interpolation:

$$Y(N-1) = x(N-1) + \tau \cdot (x(N) - x(N-1)) \tag{1}$$

where $x(N-1)$ and $x(N)$ are the channel samples surrounding the target sample; and $\tau$ is an interpolation interval proportional to a time difference between the channel sample value $x(N-1)$ and the target sample value. The interpolation interval $\tau$ is generated at the output of modulo-Ts accumulator 250 which accumulates the frequency offset signal $\Delta f$ 244 at the output of the PID loop filter 262:

$$\tau = (\Sigma \Delta f) \, MOD \; TS \tag{2}$$

where Ts is the sampling period of the sampling clock 210. Since the sampling clock 210 samples the analog read signal slightly faster than the baud rate, it is necessary to mask the data clock every time the accumulated frequency offset $\Delta f$, integer divided by Ts, increments by 1. Operation of the data clock 212A and the mask signal 260 generated by the modulo-Ts accumulator 250 is understood with reference to the timing diagram of FIG. 12.

Assuming the interpolator implements the simple linear equation (1) above, then channel sample values 280 and 282 are used to generate the interpolated sample value corresponding to target sample value 284. The interpolation interval $\tau$ 286 is generated according to equation (2) above. The next interpolated sample value corresponding to the next target value 288 is computed from channel sample values 282 and 290. This process continues until the interpolation interval $\tau$ 292 would be greater than Ts except that it "wraps" around and is actually $\tau$ 294 (i.e., the accumulated frequency offset $\Delta f$, integer divided by Ts, increments by 1 causing the mask signal 260 to activate). At this point, the data clock 212A is masked by mask signal 260 so that the interpolated sample value corresponding to the target sample value 296 is computed from channel sample values 298 and 300 rather than channel sample values 302 and 298.

The simple linear interpolation of equation (1) will only work if the analog read signal is sampled at a much higher frequency than the baud rate. This is not desirable since operating the channel at higher frequencies increases its complexity and cost. Therefore, in the preferred embodiment the interpolator 252 is implemented as a time varying FIR filter responsive to more than two channel samples to compute the interpolated sample value.

The ideal discrete time phase interpolation filter has a flat magnitude response and a constant group delay of $\tau$:

$$C_\tau(e^{j\omega}) = e^{j\omega\tau} \tag{3}$$

which has an ideal impulse response:

$$\mathrm{sinc}(\pi \cdot (n - \tau/T_s)). \tag{4}$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\overline{C}_\tau(e^{j\omega})X(e^{j\omega}) - C_\tau(e^{j\omega})X(e^{j\omega}) \tag{5}$$

where $\overline{C}_\tau(e^{j\omega})$ is the spectrum of the actual interpolation filter, and $X(e^{j\omega})$ is the spectrum of the input signal. From equation (5), the mean squared error is represented by:

$$E_\tau^2 = \frac{1}{2\pi} \int_{-\pi}^{\pi} \left| \overline{C}_\tau(e^{j\omega}) - e^{j\omega\tau} \right|^2 \, \left| X(e^{j\omega}) \right|^2 \, d\omega \tag{6}$$

where $X(e^{j\omega})$ is the spectrum of the read channel (e.g., PR4, EPR4, EEPR4 of Table 1 or some other partial response spectrum).

In practice, the above mean squared error equation (6) is modified by specifying that the spectrum of the input signal is bandlimited to some predetermined constant $0 \leq \omega \leq \alpha\pi$ where $0 < \alpha < 1$; that is:

$$|X(e^{j\omega})| = 0, \text{ for } |\omega| \geq \alpha\pi.$$

Then equation (6) can be expressed as:

$$E_{\tau,\alpha}^2 = \frac{1}{2\pi} \int_{-\alpha\pi}^{\alpha\pi} \left| \overline{C}_\tau(e^{j\omega}) - e^{j\omega\tau} \right|^2 \, \left| X(e^{j\omega}) \right|^2 \, d\omega. \tag{7}$$

The solution to the minimization problem of equation (7) involves expressing the actual interpolation filter in terms of its coefficients and then solving for the coefficients that minimize the error in a classical mean-square sense.

The actual interpolation filter can be expressed as the FIR polynomial:

$$\overline{C}_\tau(e^{j\omega}) = \sum_{n=-R}^{n=R-1} C_\tau(n) e^{-j\omega n} \tag{8}$$

where 2R is the number of taps in each interpolation filter and the sample period Ts has been normalized to 1. A mathematical derivation for an interpolation filter having an even number of coefficients is provided below. It is within the ability of those skilled in the art to modify the mathematics to derive an interpolation filter having an odd number of coefficients.

Substituting equation (8) into equation (7) leads to the desired expression in terms of the coefficients $C_\tau(n)$:

$$E_{\tau,\alpha}^2 = \frac{1}{2\pi} \int_{-\alpha\pi}^{\alpha\pi} \left| \sum_{n=-R}^{n=R-1} C_\tau(n) e^{-j\omega n} - e^{j\omega\tau} \right|^2 \, \left| X(e^{j\omega}) \right|^2 \, d\omega. \tag{9}$$

The next step is to take the derivatives of equation (9) with respect to the coefficients $C_\tau(n)$ and set them to zero:

$$\frac{\partial E_{\tau,\alpha}^2}{\partial C_\tau(n_o)} = 0 \text{ for } n_o = -R, \ldots, 0, 1, \ldots, R-1. \quad (10)$$

After careful manipulation, equation (10) leads to:

$$\int_{-\alpha\pi}^{\alpha\pi}\left[\left(\sum_{n=-R}^{n=R-1} C_\tau(n)\cos(\omega(n_o-n))\right) - \cos(\omega(n_o+\tau))\right]|X(e^{j\omega})|^2 d\omega = 0 \quad (11)$$

$$\text{for } n_o = -R, \ldots, 0, 1, R-1.$$

Defining φ(r) as:

$$\phi(r) = \int_{-\alpha\pi}^{\alpha\pi} |X(e^{j\omega})|^2 \cos(\omega r) d\omega \quad (12)$$

and substituting equation (12) into equation (11) gives:

$$\sum_{n=-R}^{n=R-1} C_\tau(n)\phi(n-n_o) = \phi(n_o+\tau) \quad (13)$$

$$\text{for } n_o = -R, \ldots, 0, 1, \ldots, R-1.$$

Equation (13) defines a set of 2R linear equations in terms of the coefficients $C_\tau(n)$. Equation (13) can be expressed more compactly in matrix form:

$$\Phi_T C_\tau = \Phi_\tau$$

where $C_\tau$ is a column vector of the form:

$$C_\tau = [C_\tau(-R), \ldots, C_\tau(0), \ldots, C_\tau(R-1)]^t$$

$\Phi_T$ is a Toeplitz matrix of the form:

$$\Phi_T = \begin{bmatrix} \phi(0) & \phi(1) & \ldots & \phi(2R-1) \\ \phi(1) & \phi(0) & & \\ \vdots & & & \vdots \\ \vdots & & & \vdots \\ \phi(2R-1) & & \ldots & \phi(0) \end{bmatrix}$$

and $\Phi_\tau$ is a column vector of the form:

$$\Phi_\tau = [\phi(-R+\tau), \ldots, \phi(\tau), \phi(1+\tau), \ldots, \phi(R-1+\tau)]^t. \quad (14)$$

The solution to equation (14) is:

$$C_\tau = \Phi_T^{-1}\Phi_\tau \quad (15)$$

where $\Phi_T^{-1}$ is an inverse matrix that can be solved using well known methods.

Table 2 shows example coefficients $C_\tau(n)$ calculated from equation (15) with 2R=6, α=0.8 and $X(e^{j\omega})$=PR4:

TABLE 2

| τ · 32/Ts | C(-2) | C(-2) | C(0) | C(1) | C(2) | C(3) |
|---|---|---|---|---|---|---|
| 0 | 0.0000 | −0.0000 | 1.0000 | 0.0000 | −0.0000 | 0.0000 |
| 1 | 0.0090 | −0.0231 | 0.9965 | 0.0337 | −0.0120 | 0.0068 |
| 2 | 0.0176 | −0.0445 | 0.9901 | 0.0690 | −0.0241 | 0.0135 |
| 3 | 0.0258 | −0.0641 | 0.9808 | 0.1058 | −0.0364 | 0.0202 |
| 4 | 0.0335 | −0.0819 | 0.9686 | 0.1438 | −0.0487 | 0.0268 |
| 5 | 0.0407 | −0.0979 | 0.9536 | 0.1829 | −0.0608 | 0.0331 |
| 6 | 0.0473 | −0.1120 | 0.9359 | 0.2230 | −0.0728 | 0.0393 |
| 7 | 0.0533 | −0.1243 | 0.9155 | 0.2638 | −0.0844 | 0.0451 |
| 8 | 0.0587 | −0.1348 | 0.8926 | 0.3052 | −0.0957 | 0.0506 |
| 9 | 0.0634 | −0.1434 | 0.8674 | 0.3471 | −0.1063 | 0.0556 |

TABLE 2-continued

| τ · 32/Ts | C(-2) | C(-2) | C(0) | C(1) | C(2) | C(3) |
|---|---|---|---|---|---|---|
| 10 | 0.0674 | −0.1503 | 0.8398 | 0.3891 | −0.1164 | 0.0603 |
| 11 | 0.0707 | −0.1555 | 0.8101 | 0.4311 | −0.1257 | 0.0644 |
| 12 | 0.0732 | −0.1589 | 0.7784 | 0.4730 | −0.1341 | 0.0680 |
| 13 | 0.0751 | −0.1608 | 0.7448 | 0.5145 | −0.1415 | 0.0710 |
| 14 | 0.0761 | −0.1611 | 0.7096 | 0.5554 | −0.1480 | 0.0734 |
| 15 | 0.0765 | −0.1598 | 0.6728 | 0.5956 | −0.1532 | 0.0751 |
| 16 | 0.0761 | −0.1572 | 0.6348 | 0.6348 | −0.1572 | 0.0761 |
| 17 | 0.0751 | −0.1532 | 0.5956 | 0.6728 | −0.1598 | 0.0765 |
| 18 | 0.0734 | −0.1480 | 0.5554 | 0.7096 | −0.1611 | 0.0761 |
| 19 | 0.0710 | −0.1415 | 0.5145 | 0.7448 | −0.1608 | 0.0751 |
| 20 | 0.0680 | −0.1341 | 0.4730 | 0.7784 | −0.1589 | 0.0732 |
| 21 | 0.0644 | −0.1257 | 0.4311 | 0.8101 | −0.1555 | 0.0707 |
| 22 | 0.0603 | −0.1164 | 0.3891 | 0.8398 | −0.1503 | 0.0674 |
| 23 | 0.0556 | −0.1063 | 0.3471 | 0.8674 | −0.1434 | 0.0634 |
| 24 | 0.0506 | −0.0957 | 0.3052 | 0.8926 | −0.1348 | 0.0587 |
| 25 | 0.0451 | −0.0844 | 0.2638 | 0.9155 | −0.1243 | 0.0533 |
| 26 | 0.0393 | −0.0728 | 0.2230 | 0.9359 | −0.1120 | 0.0473 |
| 27 | 0.0331 | −0.0608 | 0.1829 | 0.9536 | −0.0979 | 0.0407 |
| 28 | 0.0268 | −0.0487 | 0.1438 | 0.9686 | −0.0819 | 0.0335 |
| 29 | 0.0202 | −0.0364 | 0.1058 | 0.9808 | −0.0641 | 0.0258 |
| 30 | 0.0135 | −0.0241 | 0.0690 | 0.9901 | −0.0445 | 0.0176 |
| 31 | 0.0068 | −0.0120 | 0.0337 | 0.9965 | −0.0231 | 0.0090 |

Figure 13:
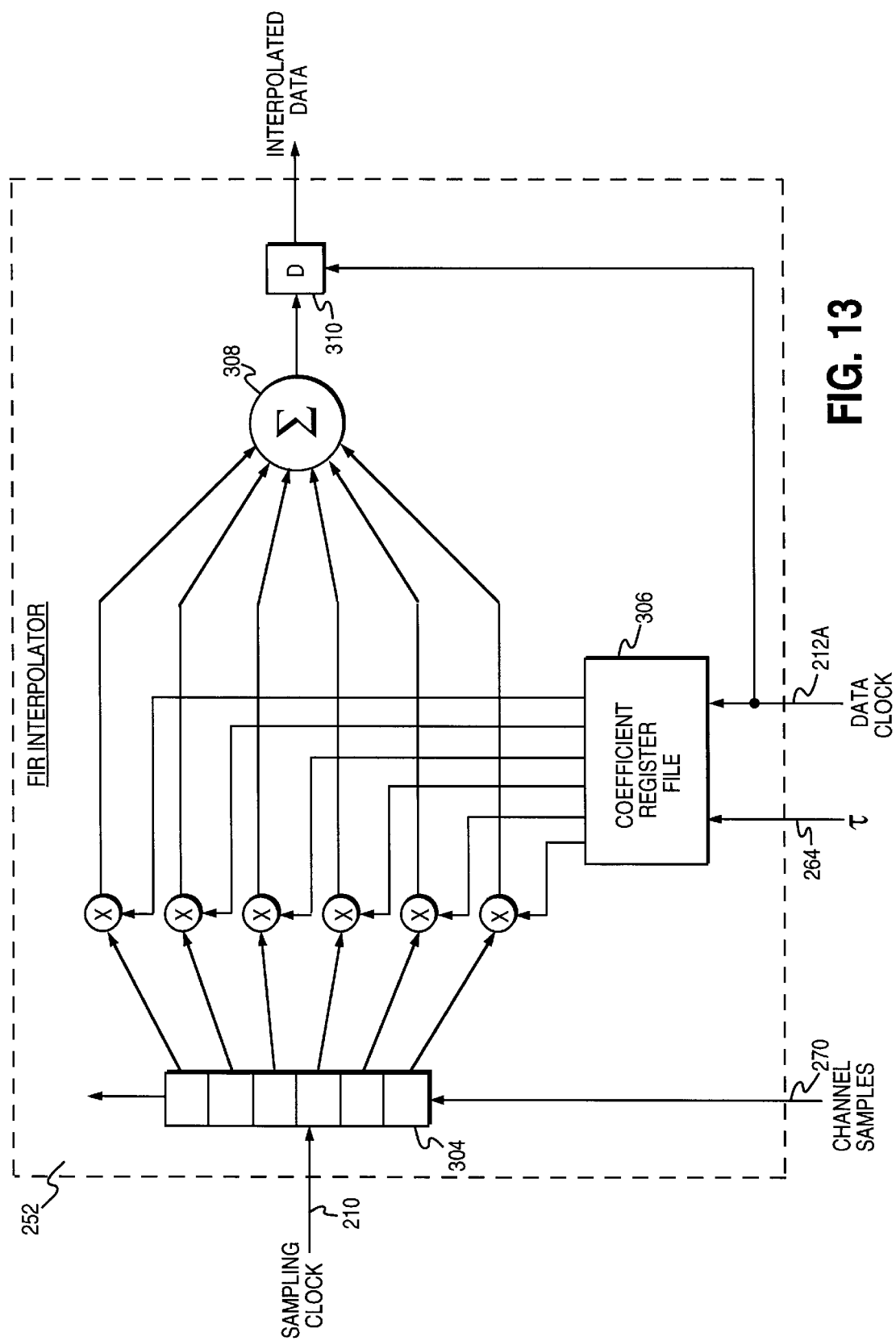
FIG. 13 shows details of a finite impulse response (FIR) filter for carrying out the timing recovery interpolation function.

FIG. 13 shows an implementation of a six tap FIR filter which operates according to the coefficients shown in Table 2. A shift register 304 receives the channel samples 270 at the sampling clock rate 210. The filter coefficients $C_\tau(n)$ are stored in a coefficient register file 306 and applied to corresponding multipliers according to the current value of τ 264. The coefficients are multiplied by the channel samples 270 stored in the shift register 304. The resulting products are summed 308 and the sum stored in a delay register 310. The coefficient register file 306 and the delay register 310 are clocked by the data clock 212A to implement the masking function described above.

Multiple Independent Recording Heads

An alternative embodiment of the present invention is to employ two recording heads (or two sets of recording heads) that operate independently using two VCM rotary actuators (i.e., duplicating the VCM rotary actuator 32 and load beams 30 of FIGS. 2 and 3). In this manner, the recording heads can access any two sectors per disc and carry out independent read or write operations simultaneously on those sectors. Furthermore, the multiple data stream read channel of FIG. 9 is capable of processing the multiple read signals in parallel even if the recording heads are in different zones of the disc (i.e., reading data recorded at differing baud rates). Again, this is a result of using interpolated timing recovery of FIG. 11B as opposed to using conventional synchronous sampling timing recovery of FIG. 11A. Each interpolation filter in the individual timing recovery circuits are simply configured to interpolate to the baud rate of their corresponding read signal. The frequency synthesizer 208 of FIG. 9 still generates one reference clock 210 at a constant frequency for clocking operation of all the discrete time circuitry. For more details concerning this embodiment, refer to co-pending U.S. patent application Ser. No. 08/567,682 entitled "FIXED SAMPLE RATE SAMPLED AMPLITUDE READ CHANNEL FOR ZONED MAGNETIC RECORDING," the disclosure of which is hereby incorporated by reference.

The objects of the invention have been fully realized through the embodiments disclosed herein. Those skilled in the art will appreciate that the aspects of the invention can be achieved through various other embodiments without departing from the essential function. The particular embodiments disclosed are illustrative and not meant to limit the scope of the invention as appropriately construed by the following claims.

We claim:

1. A disc storage device, comprising:
   (a) a disc storage medium comprising a top surface and a bottom surface where data is recorded on each surface in the format of a plurality of data tracks and embedded servo wedges;
   (b) a first actuator for simultaneously positioning a top recording head over the top surface of the disc and a bottom recording head over the bottom surface of the disc;
   (c) a top load beam comprising a base end connected to the first actuator and a distal end extending out over the top surface of the disc, wherein the top recording head is connected to the distal end of the top load beam;
   (d) a bottom load beam comprising a base end connected to the first actuator and a distal end extending out over the bottom surface of the disc, wherein the bottom recording head is connected to the distal end of the bottom load beam;
   (e) a second actuator connected to the distal end of one of the load beams for positioning one of the recording heads independent of the other recording head, wherein:
   (a) a top data track on the top surface of the disc comprises a first plurality of physical data sectors, and a bottom data track on the bottom surface of the disc comprises a second plurality of physical data sectors; and
   (b) a logical sector number sequence is assigned to the physical data sectors in the top and bottom data tracks in an interleaved manner.

2. A disc storage device, comprising:
   (a) a disc storage medium comprising a top surface and a bottom surface where data is recorded on each surface in the format of a plurality of data tracks and embedded servo wedges;
   (b) a first actuator for simultaneously positioning a top recording head over the top surface of the disc and a bottom recording head over the bottom surface of the disc;
   (c) a top load beam comprising a base end connected to the first actuator and a distal end extending out over the top surface of the disc, wherein the top recording head is connected to the distal end of the top load beam;
   (d) a bottom load beam comprising a base end connected to the first actuator and a distal end extending out over the bottom surface of the disc, wherein the bottom recording head is connected to the distal end of the bottom load beam;
   (e) a second actuator connected to the distal end of one of the load beams for positioning one of the recording heads independent of the other recording head, wherein:
   (a) a top data track on the top surface of the disc comprises a first plurality of physical data sectors, and a bottom data track on the bottom surface of the disc comprises a second plurality of physical data sectors; and
   (b) a first part of a logical data sector is stored in a first physical data sector in the top data track and a second part of the logical data sector is stored in a second physical data sector in the bottom data track.

3. A disc storage device, comprising:
   (a) a disc storage medium comprising a top surface and a bottom surface where data is recorded on each surface in the format of a plurality of data tracks and embedded servo wedges;
   (b) a first actuator for simultaneously positioning a top recording head over the top surface of the disc and a bottom recording head over the bottom surface of the disc;
   (c) a top load beam comprising a base end connected to the first actuator and a distal end extending out over the top surface of the disc, wherein the top recording head is connected to the distal end of the top load beam;
   (d) a bottom load beam comprising a base end connected to the first actuator and a distal end extending out over the bottom surface of the disc, wherein the bottom recording head is connected to the distal end of the bottom load beam;
   (e) a second actuator connected to the distal end of one of the load beams for positioning one of the recording heads independent of the other recording head, wherein:
   (a) a top data track on the top surface of the disc comprises a first plurality of physical data sectors, and a bottom data track on the bottom surface of the disc comprises a second plurality of physical data sectors;
   (b) a logical data sector comprises a first physical data sector in the top data track and a second physical data sector in the bottom data track; and
   (c) the logical data sector comprises a plurality of data symbols interleaved in the first physical data sector and in the second physical data sector.

4. A disc storage device, comprising:
   (a) a disc storage medium comprising a top surface and a bottom surface where data is recorded on each surface in the format of a plurality of data tracks and embedded servo wedges;
   (b) a first actuator for simultaneously positioning a top recording head over the top surface of the disc and a bottom recording head over the bottom surface of the disc;
   (c) a top load beam comprising a base end connected to the first actuator and a distal end extending out over the top surface of the disc, wherein the top recording head is connected to the distal end of the top load beam;
   (d) a bottom load beam comprising a base end connected to the first actuator and a distal end extending out over the bottom surface of the disc, wherein the bottom recording head is connected to the distal end of the bottom load beam;
   (e) a second actuator connected to the distal end of one of the load beams for positioning one of the recording heads independent of the other recording head;
   (f) a first sliding mode controller for controlling the first actuator; and
   (g) a second sliding mode controller for controlling the second actuator.

5. The disc storage device as recited in claim 4, wherein:
   (a) the sliding mode controllers switch between a first and a second structure;
   (b) the first structure causes at least two phase states to change relative to a phase plane to follow a first phase trajectory;
   (c) the second structure causes the two phase states to change relative to the phase plane to follow a second phase trajectory;
   (d) the first and second phase trajectories intersect in opposite directions in at least part of the phase plane; and (e) by switching between the first and second structures the sliding mode controller causes the two phase states to change relative to the phase plane to substantially follow a predetermined third phase trajectory in the part of the phase plane where the first and second phase trajectories intersect.

6. A disc storage device, comprising:

(a) a disc storage medium comprising a top surface and a bottom surface where data is recorded on each surface in the format of a plurality of data tracks and embedded servo wedges;

(b) a first actuator for simultaneously positioning a top recording head over the top surface of the disc and a bottom recording head over the bottom surface of the disc;

(c) a topload beam comprising a base end connected to the first actuator and a distal end extending out over the top surface of the disc, wherein the top recording head is connected to the distal end of the top load beam;

(d) a bottom load beam comprising a base end connected to the first actuator and a distal end extending out over the bottom surface of the disc, wherein the bottom recording head is connected to the distal end of the bottom load beam;

(e) a second actuator connected to the distal end of one of the load beams for positioning one of the recording heads independent of the other recording head;

(f) a frequency synthesizer for generating a sampling clock at a predetermined frequency;

(g) a first sampled amplitude read channel for detecting data from a first analog read signal emanating from the top recording head, comprising;

(i) a first sampling device, responsive to the sampling clock, for asynchronously sampling the first analog read signal to generate a sequence of first asynchronous sample values;

(ii) a first interpolated timing recovery circuit, responsive to the sampling clock and the first sequence of asynchronous sample values, for generating first interpolated sample values substantially synchronized to a baud rate of the recorded data; and (iii) a first sequence detector for detecting a first estimated data sequence from the first interpolated sample values; and (h) a second sampled amplitude read channel for detecting data from a second analog read signal emanating from the bottom recording head, comprising;

(i) a second sampling device, responsive to the sampling clock, for asynchronously sampling the second analog read signal to generate a second sequence of asynchronous sample values;

(ii) a second interpolated timing recovery circuit, responsive to the sampling clock and the second sequence of asynchronous sample values, for generating second interpolated sample values substantially synchronized to a baud rate of the recorded data; and (iii) a second sequence detector for detecting a second estimated data sequence from the second interpolated sample values.

7. The disc storage device as recited in claim 6, wherein:

(a) the first interpolated timing recovery circuit generates a first data clock for clocking operation of the first sequence detector; and (b) the second interpolated timing recovery circuit generates a second data clock for clocking operation of the second sequence detector.

* * * * *